(12) United States Patent
Long et al.

(10) Patent No.: US 10,692,334 B2
(45) Date of Patent: Jun. 23, 2020

(54) DOORBELL SYSTEM WITH PULSE-DRIVEN BOOST RECTIFIER

(71) Applicant: Logitech Europe S.A., Lausanne (CH)

(72) Inventors: John M. Long, San Jose, CA (US); Jonathan Reckless, Walnut Creek, CA (US); Aron Rosenberg, Lafayette, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/389,515

(22) Filed: Apr. 19, 2019

(65) Prior Publication Data

US 2020/0005604 A1   Jan. 2, 2020

Related U.S. Application Data

(63) Continuation of application No. 16/024,586, filed on Jun. 29, 2018, now Pat. No. 10,311,685.

(51) Int. Cl.
| | |
|---|---|
| *G08B 3/10* | (2006.01) |
| *G10K 1/063* | (2006.01) |
| *H02J 3/12* | (2006.01) |
| *G08B 29/10* | (2006.01) |
| *H02M 1/42* | (2007.01) |

(52) U.S. Cl.
CPC ............... *G08B 3/10* (2013.01); *G08B 29/10* (2013.01); *G10K 1/063* (2013.01); *H02J 3/12* (2013.01); *H02M 1/4233* (2013.01)

(58) Field of Classification Search
CPC . G08B 3/10; G10K 1/063; H02J 3/12; H02M 1/4233
USPC ................................................... 340/328, 330
See application file for complete search history.

(56) References Cited

U.S. PATENT DOCUMENTS

| | | | |
|---|---|---|---|
| 5,428,388 A | 6/1995 | von Bauer et al. | |
| 7,417,535 B2 | 8/2008 | Mathews et al. | |
| 7,429,924 B2 | 9/2008 | Langer et al. | |
| 7,477,134 B2 * | 1/2009 | Langer ..................... | G08B 3/10 340/326 |
| 8,193,919 B2 | 6/2012 | Langer et al. | |
| 10,311,685 B1 | 6/2019 | Long et al. | |
| 2007/0008077 A1 * | 1/2007 | Claiborne ................ | G08B 3/10 340/330 |
| 2015/0339895 A1 | 11/2015 | Chen et al. | |
| 2017/0221319 A1 * | 8/2017 | Chen .......................... | H02J 3/12 |

* cited by examiner

*Primary Examiner* — Emily C Terrell
(74) *Attorney, Agent, or Firm* — Kilpatrick Towsend & Stockton LLP

(57) ABSTRACT

In some embodiments, a power supply in a doorbell system includes a boost rectifier circuit with a plurality of active devices arranged in a bridge topology that are configured to receive an AC input voltage, generate a DC output voltage by rectifying the AC input voltage, drive an electric load using the rectified DC voltage, and boost an amplitude of the AC input voltage. Two of the plurality of active devices in the boost rectifier circuit may be pulse driven and can control an operation of a mechanical or digital chime device. The chime device can include a solenoid and the boost rectifier circuit may utilize the solenoid as an energy storage element to facilitate the boosting of the amplitude of the AC input voltage. The boost rectifier circuit may boost the AC input voltage by at least a multiplication factor of two.

20 Claims, 23 Drawing Sheets

DOORBELL SYSTEM WITH PULSE-DRIVEN BOOST RECTIFIER

CROSS REFERENCE PARAGRAPH FOR PRIORITY

This application is continuation of U.S. Non-Provisional application Ser. No. 16/024,586, filed on Jun. 29, 2018, and titled "DOORBELL SYSTEM WITH PULSE-DRIVEN BOOST RECTIFIER," which is hereby incorporated by reference in its entirety for all purposes.

BACKGROUND

A doorbell is typically configured as a signaling device placed near a door to a building's entrance that, when activated, alerts an occupant to the presence of a visitor. Doorbells have existed for over 200 years with early versions using mechanical actuators (e.g., pull cords) to strike a bell plate, and later commercially available models (circa 1900) using electrical systems with chimes, bells, or buzzers. Conventional electrically controlled doorbell systems with mechanical chimes have changed little over the years and still exist in many households today.

There have been many technological advances in doorbell systems since their inception. For instance, some doorbell systems may incorporate wireless technology. For example, the doorbell button may contain a battery-powered radio transmitter that sends button state data (e.g., on or off) to a receiver that triggers a chime. Some chimes may be digitally implemented using a sound chip that plays the sound of a bell through a speaker. Some contemporary systems may incorporate a video camera to provide the user with a visual confirmation of the visitor.

Despite the many advances, many contemporary systems that enhance existing doorbell implementations (e.g., adding video capability) need cumbersome add-on supplementary circuitry that is often subject to significant power constraints and limited functionality, require trained technicians to test existing systems and properly install the add-on circuitry, and often require significant doorbell system overhauls that can be costly. Better doorbell system designs are needed.

BRIEF SUMMARY

In some embodiments, a power supply in a doorbell system includes a doorbell button and a boost rectifier circuit including a plurality of active devices configured in a bridge circuit topology. In response to the doorbell button (e.g., switch) being deactivated, the boost rectifier circuit can be configured to: receive an alternating current (AC) input voltage, simultaneously rectify and boost the AC input voltage thereby generating a direct current (DC) output voltage with a higher voltage amplitude than the AC input voltage, and drive an electric load with the boosted and rectified DC voltage. In response to the doorbell button being activated, the boost rectifier circuit can be configured to receive and bypass the AC input voltage. For example, bypassing the AC input voltage can include creating a short or near-short condition (very low impedance). In some cases, this can significantly increase or maximize a current through a bell circuit (mechanical or digital chime device) causing it to ring (activate).

In some cases, the boost rectifier circuit can be configured to be coupled to a mechanical chime device in the doorbell system, the mechanical chime device including a solenoid configured to be driven by the AC input voltage, where the boost rectifier circuit utilizes the solenoid of the mechanical chime device as an energy storage element to facilitate the boosting of the amplitude of the AC input voltage, and where the boost rectifier circuit bypassing the AC input voltage causes the mechanical chime device to ring in response to the doorbell switch being activated. The boost rectifier circuit may be configured to dynamically adjust a boost profile for the boosting of the AC input voltage based on an amplitude of the AC input voltage, where the boost profile pulse shapes an AC current signal driving the solenoid from a sinusoidal current waveform to a substantially square-wave current waveform (or other suitable current waveform). The pulse shaping of the AC current signal into a square-wave current waveform can cause a reduction in a maximum current (e.g., peak current) of the AC current signal and a reduction in a transition time between phases of the AC current signal.

In some cases, the at least two of the plurality of active devices in the boost rectifier circuit can be field-effect transistors (FETs). The power supply can further include one or more processors and a pulse-width modulator (PWM) circuit controlled by the one or more processors. The PWM circuit can be configured to drive the FETs with a pulsed input voltage that controls the boost profile. The PWM circuit can include a digital-to-analog converter (DAC) controlled by the one or more processors and a comparator circuit controlled by the one or more processors, where the DAC can dynamically set a current limit threshold for the AC current signal passing through the solenoid (solenoid current) based on a current power requirement of the load, where the comparator can compare the current limit threshold with the solenoid current and generates a corresponding comparator output signal, and the PWM circuit can adjust a duty cycle of the pulsed input voltage based on the comparator output signal. The boost rectifier circuit can be further configured to drive a battery charging circuit for a battery system configured to provide power to the electric load. The electric load can include a video camera system, audio system, sensor system, communication system, battery charging system (derivative power supply system), or the like.

In some embodiments, a method of operating a boost rectifier circuit of a doorbell system may include receiving, by an input of a boost rectifier circuit, an AC input voltage; simultaneously boosting an amplitude of the AC input voltage and rectifying the AC input voltage, thereby generating a boosted DC output voltage at an output of the boost rectifier circuit; driving an electrical load with the boosted DC output voltage; measuring an AC current through a solenoid of a mechanical doorbell chime circuit coupled to the input of the boost rectifier circuit, the solenoid driven by the AC input voltage, and the solenoid operating as an energy storage element configured to facilitate the boosting of the amplitude of the AC input voltage by the boost rectifier circuit; and dynamically modifying a boosting profile on the AC input voltage based on: the measured AC current in the solenoid; and an amplitude of the AC input voltage. The boost rectifier circuit may include at least four active circuit elements configured in a bridge circuit topology, and at least two of the four active circuit elements can be field-effect transistors (FETs) configured to control the boosting profile of the AC input voltage. Other types of active devices can be used, as further described below.

In some implementations, dynamically modifying the boosting profile of the AC input voltage can further include applying a pulsed voltage at inputs of the FETs and generating a charge/discharge ramp for each cycle of the AC input voltage based on the pulsed voltage, wherein the charge/discharge ramp affects the boosting profile of the AC input voltage. In some cases, the charge ramp may correspond to periods of time when the pulsed voltage is on, the discharge ramp may correspond to periods of time when the pulsed voltage is off, and a ratio of the charge-to-discharge periods may define an operational duty cycle for the FETs. The pulsed voltage may be on during each phase of the AC input voltage while the measured AC current through the solenoid is below a threshold current value, and the pulsed voltage may be off during each phase of the AC input voltage while the measured AC current through the solenoid is at or above the threshold current value. In certain embodiments, the pulse-width modulator applies the pulsed voltage at the input of the FETs. The electrical load can include a video camera system, audio system, sensor system, communication system, battery charging system (derivative power supply system), or the like.

In further embodiments, a boost rectifier circuit for a doorbell system can include a first diode, a second diode, a first field-effect transistor (FET) and a second FET. In some cases, a drain of the first FET can be coupled to an anode of the first diode, the drain of the first FET can be configured to be coupled to an AC voltage source through a solenoid of a mechanical doorbell chime circuit, a gate of the first FET may be driven by a pulse-width modulator, and a source of the first FET can be coupled to an electrical ground through a resistor. In some cases, a drain of the second FET can be coupled to an anode of the second diode, the drain for the second FET can be configured to be coupled to the AC voltage source, a gate of the second FET can be driven by the pulse-width modulator, a source of the second FET can be coupled to an electrical ground through a resistor, and a cathode of the first diode and a cathode of the second diode can be coupled together forming a boost rail node. In some cases, the first diode or the second diode may be a third FET wherein a source of the third FET is coupled to a drain of the third FET (using body diode characteristics of the FET). The pulse width modulator can be configured to provide a pulsed voltage input to the first and second FETs causing the first and second FETs to boost an amplitude of an AC input voltage received from the AC voltage source. The pulsed voltage can be on during each phase of the AC input voltage while a measured AC current through the solenoid is below a threshold current value, and the pulsed voltage can be off during each phase of the AC input voltage while the measured AC current through the solenoid is at or above the threshold current value.

BRIEF DESCRIPTION OF THE DRAWINGS

The detailed description is set forth with reference to the accompanying figures.

DETAILED DESCRIPTION

Figure 1:
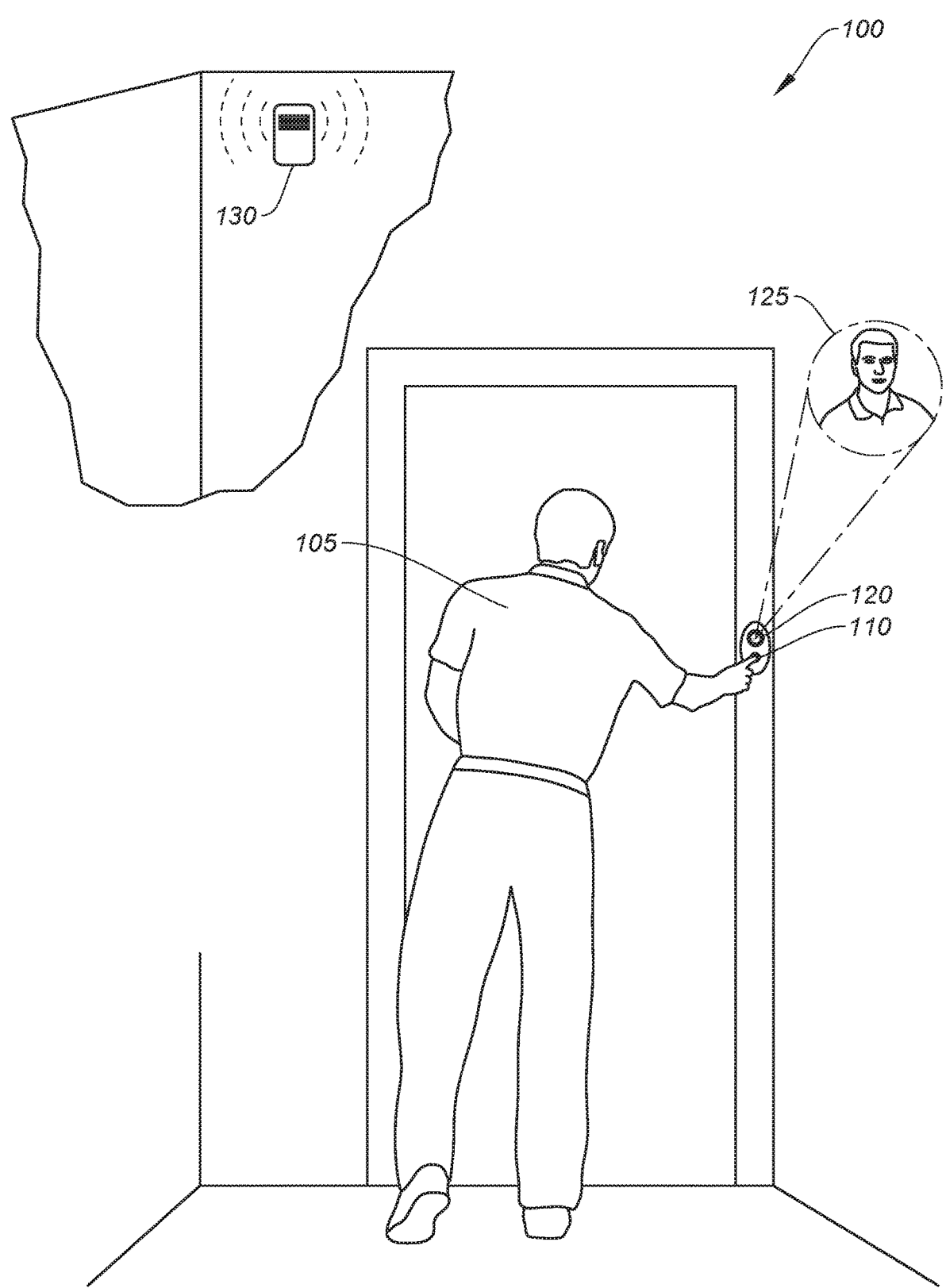
FIG. 1 shows a user operating a doorbell system at a residence, according to certain embodiments.

Embodiments of this invention are generally directed to electronic systems. More specifically, some embodiments relate to an improved doorbell system using boost rectification to improve power consumption characteristics for wide variety of supplementary doorbell system modifications, additions, and other system enhancing applications.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Aspects of the invention relate to a novel boost rectifier circuit that can be incorporated into an existing conventional doorbell system in a "plug and play" fashion, such that no additional modifications or complicated installations are required. A user can simply replace a conventional button in a doorbell system with boost rectifier circuit-enabled system (e.g., Wi-Fi enabled video camera system), and the existing power supply structure can provision a substantially increased power demand of the added load without causing adverse performance effects in the existing doorbell system, such as inadvertently ringing the doorbell chime while provisioning the increased load. This is advantageous because no additional wiring or power supply (e.g., a wall outlet) is needed other than the doorbell power supply system already in place. Aspects of the invention can be applied to any conventional doorbell system including systems having different AC wall voltages (e.g., 110 V, 220 V), different step-down transformers (e.g., typically 8 V, 16 V, or 24 V), and different chime mechanisms (e.g., mechanical chimes, digital chimes, etc.). In contrast, many contemporary doorbell systems with enhanced functionality (e.g., video doorbells) often incorporate special add-on circuitry to shunt the chime mechanism, additional power supplies, or other features that often require industry expertise to properly install and, in many cases, are still hampered by power limitations.

At a high level of abstraction, aspects of the boost rectifier circuit use a plurality of active devices, such as diodes and field-effect-transistors (FETs) configured in a bridge-like topology, that takes advantage of a typically high self-inductance of a solenoid in the previously existing mechanical chime circuit and uses it as a storage element to facilitate boosting an AC input voltage (typically received from an existing step-down transformer) to drive an added load (e.g., a video camera system). Boosting the AC input voltage allows a larger portion of the AC waveform to be used to provision the load. Further, the active devices (also referred to as "active elements") may be driven in a manner that pulse shapes the current through the solenoid from a sine wave to a square wave or other wave shape, which can reduce a peak current through the solenoid, reduce a crest factor of the current, and reduce a transition time between phases (see, e.g., FIGS. 11-12), thereby providing more headroom for an increased power draw without causing the chime to inadvertently ring. Further, the mechanical doorbell switch can be functionally replaced by a voltage control schema applied to the active devices of the bridge-like topology, as further discussed below at least with respect to FIG. 6.

For a more detailed and non-limiting example, some implementations of such novel doorbell systems can include a doorbell button and a boost rectifier circuit having a plurality of active devices configured in a bridge circuit topology. In response to the doorbell button being deactivated, the boost rectifier circuit can be configured to receive an AC input voltage, simultaneously rectify and boost the AC input voltage thereby generating a direct current (DC) output voltage with a higher voltage amplitude (a "boosted" voltage) than the AC input voltage. An electric load (which may be multiple loads) can be driven with the boosted and rectified DC voltage. Some electric loads can include a Wi-Fi enabled video camera system, audio system, a battery charging system, or other suitable doorbell system enhancing application. In response to the doorbell switch being activated, the boost rectifier circuit may be configured to receive and bypass the AC input voltage, which can effectively short two or more of the plurality of active devices (e.g., field-effect transistors) to create an electrical condition functionally similar to activating a single-pole, normally open (SPNO) mechanical switch in a conventional doorbell system that causes the mechanical chime device of the doorbell system to ring.

Figure 11:
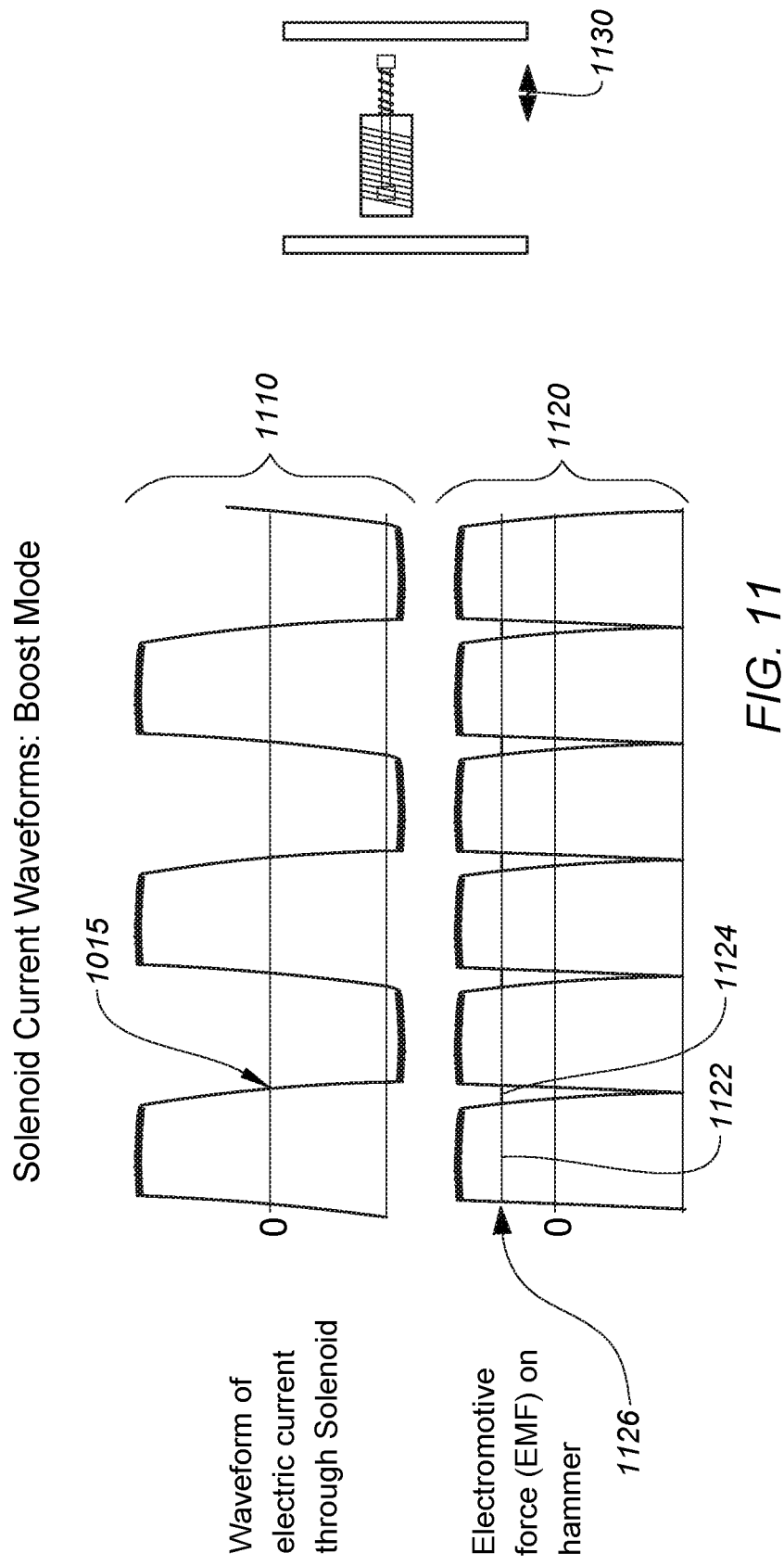
FIG. 11 shows solenoid current and electromotive force waveforms for a chime device using a boost rectifier circuit topology and electrical load, according to certain embodiments.
Figure 12:
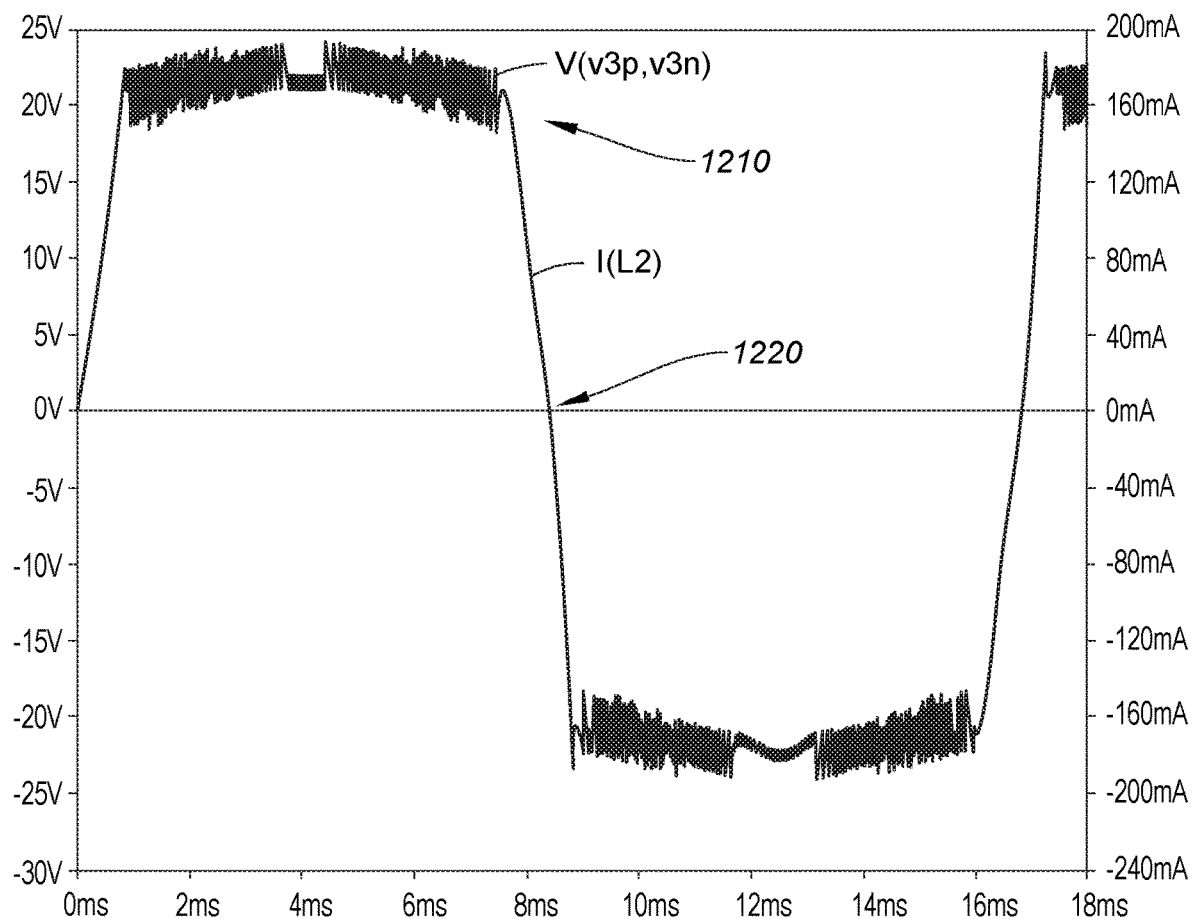
FIG. 12 shows a simplified waveform showing voltage and current for a chime device solenoid using a boost rectifier circuit topology and electrical load, according to certain embodiments.

The boost rectifier circuit can be configured to be coupled to the mechanical chime device in the doorbell system to utilize the solenoid of the mechanical chime device as an energy storage element to facilitate the boosting of the amplitude of the AC input voltage. The boost rectifier circuit can dynamically adjust a boost profile for the AC input voltage based on an amplitude of the AC input voltage in a manner that causes the AC current signal driving the solenoid to be pulse-shaped from a sinusoidal current waveform to a substantially square-wave current waveform. Certain elements of the boost rectifier circuit can be pulsed using pulse-width modulator (PWM) circuit to achieve a desired boost profile, as further described below at least with respect to FIG. 14. Some advantages to pulse-shaping in this manner include a reduction in a maximum current of the AC current signal and a reduction in a transition time between phases of the AC current signal, as shown in FIG. 11-12, which effectively allows more power to be drawn from the doorbell circuit without causing the mechanical chime to be activated (e.g., rung). It should be noted that the preceding description is meant as a general overview of certain embodiments of the invention and does not limit the many variations, modifications, and alternative embodiments contemplated throughout the totality of this document. Further, it should be understood that any of the embodiments, modifications, or the like described herein can be combined in any suitable manner, as would be appreciated by one of ordinary skill in the art with the benefit of this disclosure.

FIG. 1 shows a user 105 operating a doorbell system 100 at a residence, according to certain embodiments. Doorbell system 100 can typically include a doorbell button 110, a load (e.g., video camera 120), and a chime device (e.g., mechanical chime circuit 130). Doorbell button 110 and load 120 typically replace an original doorbell button (e.g., single pole, normally open or "SPNO" mechanical switch) in an existing doorbell system. One advantage of directly coupling to and integrating within an existing doorbell system is that no additional power supplies and/or unwieldy power cables are needed for operation. The existing power infrastructure, which is typically a stepped down voltage sourced from an AC power outlet (e.g., 110 V or 220 V), can operate to both cause the chime device to ring and drive the additional load (e.g., video camera 120). A significant challenge, however, is that drawing too much power while provisioning the load may cause the chime device (in series with the load) to ring. To address this problem, some contemporary systems with additional loads (e.g., video camera systems) need to add additional circuitry (e.g., a shunt across the chime device) or incorporate low power applications to prevent an inadvertent ringing of the chime device from occurring. In contrast, aspects of the invention present a marked improvement over contemporary designs in that certain embodiments can provide comparatively significant increases in power delivery to a load without the need of modifying or adding any new circuitry to the existing doorbell system infrastructure (e.g., chime device, transformer, wiring, etc.), without causing the chime device to inadvertently ring. Thus, a user can simply remove their existing doorbell (e.g., SPNO button) and replace it with a button plus load system (e.g., a boost rectifier circuit, as described below at least with respect to FIGS. 6 and 11-24) in a plug-and-play fashion to make for a quick and simple installation process.

Referring back to FIG. 1, image 125 can be generated by video camera 120 and coupled (e.g., via Wi-Fi) to a Wi-Fi router, hub, computing device (e.g., laptop, smart phone, smart accessory, etc.), or the like, to facilitate remote viewing, recording, and interaction (e.g., occupant may communicate with user 105 via Wi-Fi enabled 2-way audio interface). As described herein, the video camera 120 may be the primary load of the doorbell system. Alternatively or additionally, other loads may be included in doorbell system 100 including audio systems, additional sensor systems (e.g., microphones, motion sensors), communication systems (e.g., Wi-Fi, Bluetooth® standards, ZigBee, Z-Wave, infrared (IR), RF, etc.), lighting systems, control systems, audio systems, or the like. One of ordinary skill in the art with the benefit of this disclosure would understand the many variations, modifications, and alternative embodiments thereof. Although the remainder of this disclosure primarily focuses on embodiments incorporating video capabilities, it should be understood that any suitable load can be incorporated into the embodiments described herein.

Figure 2A:
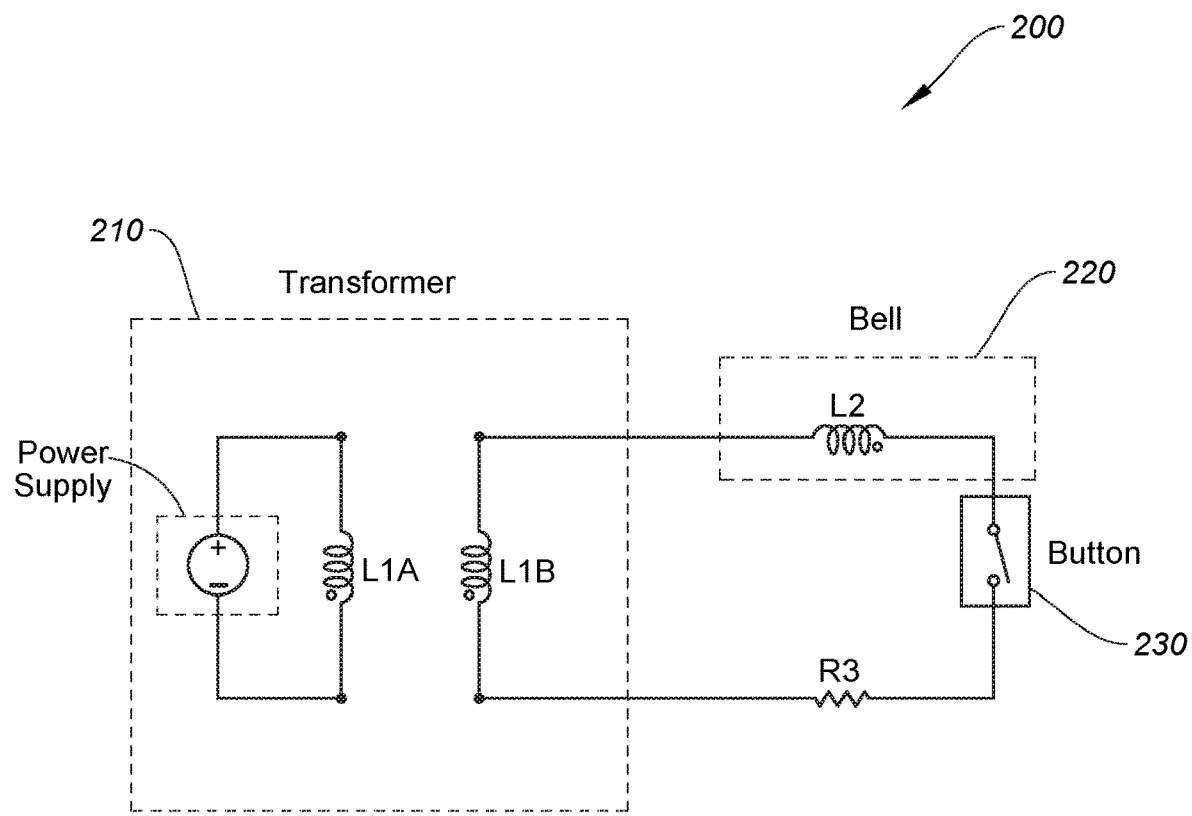
FIG. 2A shows a simplified electrical circuit schematic of a conventional doorbell system.

FIG. 2A shows a simplified electrical circuit schematic ("circuit") 200 of a conventional doorbell system. Circuit 200 typically includes a power supply ("V1"), transformer 210, bell circuit 220, and actuator 230 configured in a series-coupled arrangement, as shown. V1 can be an AC power supply, which is typically sourced by a local electric utility. In most applications, V1 may be approximately 110 V or 220 V. V1 may be coupled to transformer 210, which is typically a step-down transformer that causes an AC voltage across L1A (e.g., 110V) to step down to a lower amplitude AC voltage across L1B (e.g., 8 V, 16 V, 24 V), which may not pose the risk of an electric shock should a fault occur. The stepped-down AC voltage across L1B ("Vin") passes through bell circuit 220 and button 230.

Bell circuit 220 can be a chime device. In some cases, bell circuit may be a mechanical chime device with one or more integrated solenoids (shown as coil L2). The solenoid (typically a large, wound inductor) includes a metal rod and spring that strikes one or more bell plates when the solenoid is energized, as further shown and described below with respect to FIG. 3. Although the embodiments described herein largely include wired, solenoid-based mechanical chime devices, it should be understood that other types of chime devices including digital chime devices, wireless chime devices, alternative alert systems (e.g., intercoms), etc., may be used instead of, or in addition to, the solenoid-based implementations, as would be appreciated by one of ordinary skill in the art with the benefit of this disclosure.

Actuator 230 (referred to as a "switch" or "button") may be a mechanical switch (typically a normally off momentary pushbutton switch—SPNO) that opens and closes the series circuit. Any suitable switch type can be used (e.g., mechanical, digital, button, slider, plunger, etc.). When actuator 230 is closed (i.e., completes the circuit), AC current flows through L2 (thereby energizing L2), actuator 230, and any other circuit elements (e.g., R3) in the loop. Wiring in circuit 200 typically includes small gauge wiring (commonly referred to as "bell wiring" and "twisted pair"), but any suitable gauged wire may be used. In some embodiments using a boost rectifier circuit, as shown and further described below with respect to FIG. 6, a button press may initiate a certain biasing configuration of the boost rectifier circuit that may cause a (near) short circuit condition that effectively has the same function as closing a mechanical switch (as shown in FIGS. 2-3). Thus a user would still press a button to ring the bell, but the implementation of the ring would be electronically driven (e.g., by biasing transistors) rather than mechanically driven (e.g., physically pressing a button) to close the doorbell circuit.

In many of the embodiments that follow (e.g., FIGS. 6 and 11-24), the power source, transformer, and bell circuit may be similar to the circuit topology shown in FIG. 2, with the exception that the button is replaced by a boost rectifier circuit (e.g., FIG. 6) and load (e.g., button/video camera 110/120 of FIG. 1). This is advantageous as a replacement of a doorbell system with a more advanced doorbell system (e.g., a Wi-Fi enabled video system) may only require a user to replace the actuator 230 with the new doorbell system for a simple installation that may not require any modification to the existing doorbell system infrastructure (e.g., wiring, transformer, bell circuit, power source.

Figure 2B:
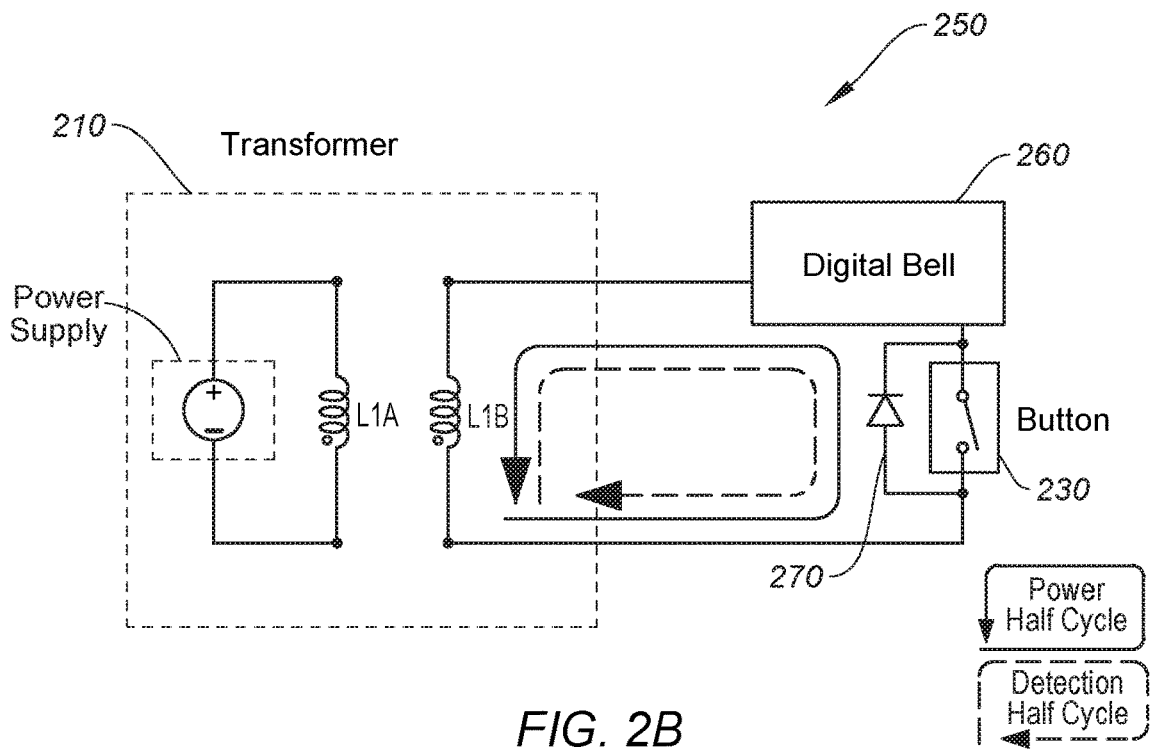
FIG. 2B shows a simplified electrical circuit schematic of a conventional electronic doorbell system.
Figure 3:
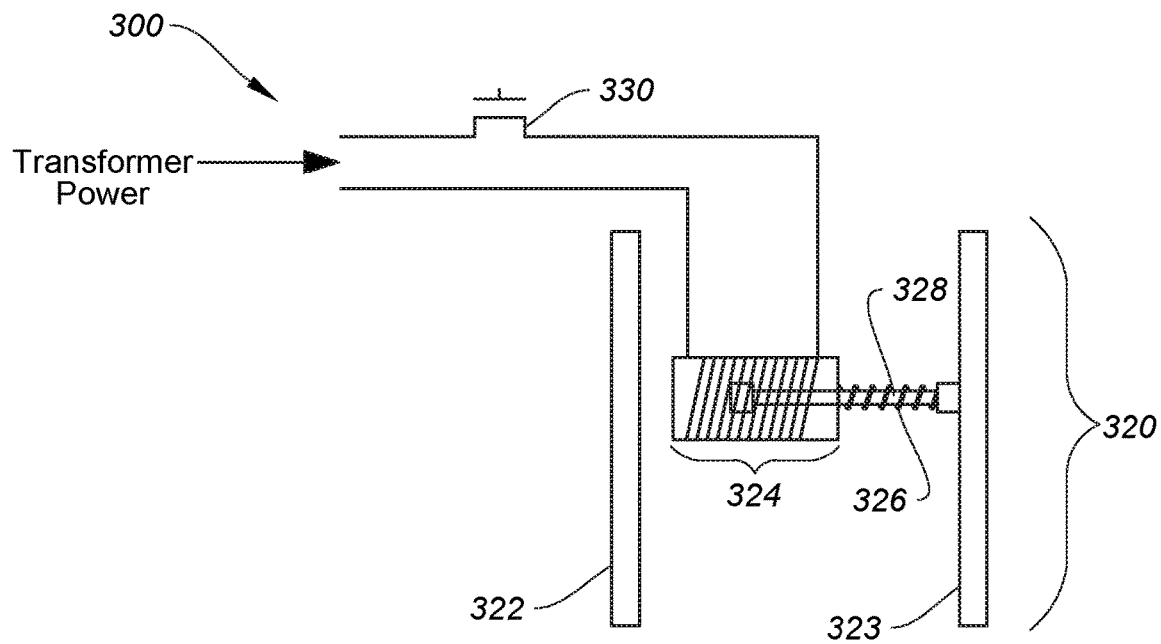
FIG. 3 shows a simplified electrical schematic of a mechanical chime circuit for a doorbell system, according to certain embodiments.

FIG. 2B shows a simplified electrical circuit schematic ("circuit 250") of an electronic doorbell system. Circuit 250 can include all of the same components as circuit 200, but with a digital doorbell system 260 instead of a mechanical chime circuit and corresponding solenoid, as described above with respect to circuit 200, and the addition of a shunted "bypass" diode 270. The bypass diode is configured in parallel with the button (e.g., switch), such that current flows through the digital bell during one of the half cycles (either A or B), which can be when the switch is open and the bypass diode is forward biased (shown as the solid-lined current path). The digital bell circuit may monitor the current flow in the direction which is normally zero (e.g., switch open with the bypass diode reverse biased) (shown as the dashed-line current path). When the button is depressed, the switch closes thus shorting the diode and increasing the current flow through the circuit. The digital bell circuit may detect this and start playing a song (e.g., user selectable). The song may continue to play after the button is released because the digital bell continues to receive power through the bypass diode in the corresponding non-detection half-cycle. The operation of a typical electronic chime-based doorbell system as shown in FIG. 2B would be appreciated by one of ordinary skill in the art with the benefit of this disclosure.

FIG. 3 shows a simplified electrical schematic of a chime system 300 for a doorbell system, according to certain embodiments. Chime system 300 may include mechanical chime circuit 320 coupled to a transformer through switch 330, similar to the circuit topology shown and described above (e.g., transformer 210 and button 230) with respect to FIG. 2. Chime circuit 320 can include a solenoid 324, plunger 328, spring 326, and resonators 322, 323. Plunger 328 (also referred to as a "hammer") is typically made of metal (e.g., iron or other ferromagnetic material) and may be configured to move into and out of a core of solenoid 324 in response to the presence of an electromagnetic field (e.g., when solenoid 324 is energized). Plunger 328 may include hammer-like features on each end to strike resonators 322, 323, however they are not required. Spring 326 may be configured in a helicoidal shape and wrapped around metal rod 328. Resonators 322, 323 (also referred to as "plates" or "chimes") may be flat metal bars (e.g., copper, brass, steel) or other material that, when struck by the plunger, produces an audible sound. Resonators 322, 323 are typically tuned to musical notes that can be configured to generate a two-tone sound (e.g., "ding-dong"). Simpler or more complex arrangements of resonators are possible, including additional solenoids, plungers, and/or resonators, to create more sophisticated musical patterns. One of ordinary skill in the art with the benefit of this disclosure would understand the many variations, modifications, and alternative embodiments thereof.

In operation, when a doorbell is pressed (e.g., switch 330 closes), an AC current provided by the transformer-coupled AC power source (e.g., 110 V AC) flows through solenoid 324), generating a magnetic field. The magnetic field causes the solenoid's plunger 328 to move through solenoid 324 with a high enough force to compress spring 326 and strike resonator 323 to ring at a first frequency with a sufficiently loud volume. When the doorbell is released, the magnetic field dissipates and a restoring force of spring 326 pushes the plunger in the opposite direction with a strong enough force to strike the other resonator 322 to ring at a second frequency with a sufficiently loud volume, thereby generating the "ding-dong" chime. Typically, the plunger is not polarized and each phase of the AC current (e.g., positive and negative current swings) cause the plunger to move in the same direction towards the same resonator. Further, some systems are under-damped to ensure that the movement of the plunger in either the energized or de-energized state can strike each resonator with a sufficient force.

Figure 4:
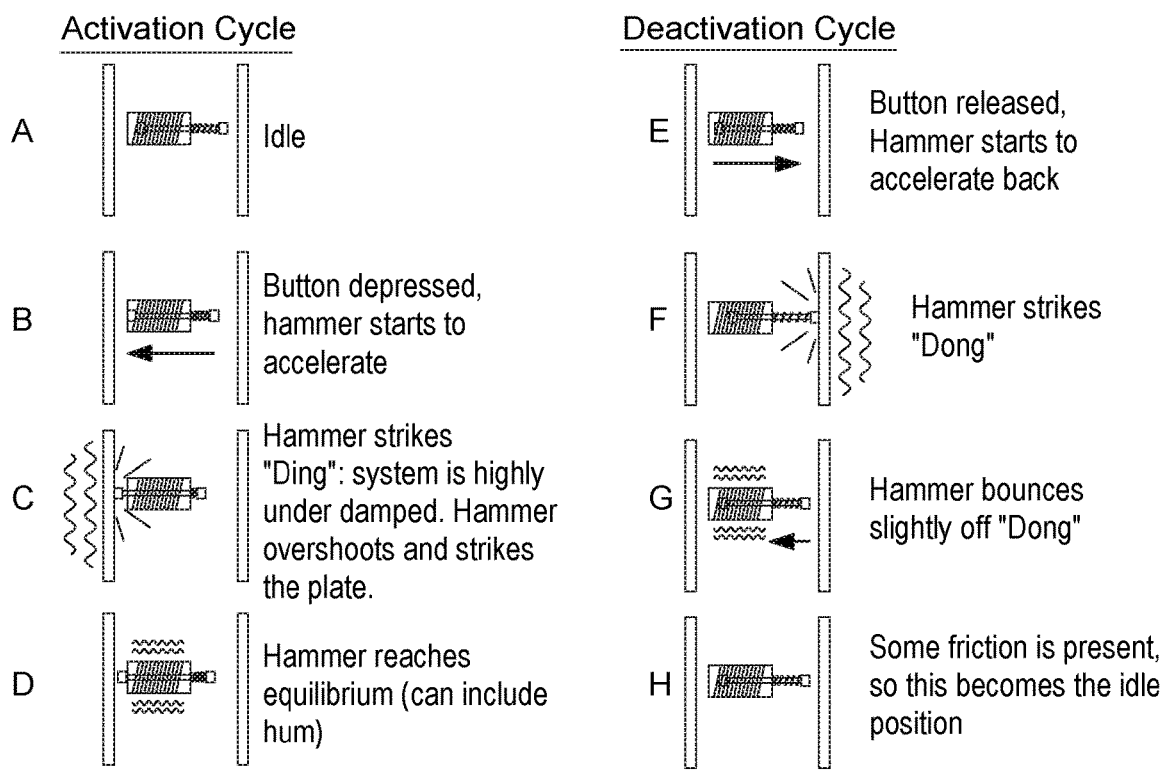
FIG. 4 shows a series of operations during an activation and deactivation cycle of a mechanical chime circuit, according to certain embodiments.

FIG. 4 shows a series of stages (A-H) during an activation and deactivation cycle of a mechanical chime circuit, according to certain embodiments. The activation cycle can include periods where AC current passes through the solenoid (e.g., circuit is closed), corresponding to stages A-D. The deactivation cycle can include periods of time where no AC current is passing through the solenoid (circuit is open), corresponding to stages E-H. At stage A, the mechanical chime circuit can be idle. Typically, stage A may correspond to a period of no current flow through the solenoid where enough time has passed such that any movement has ceased and any vibrations or reverberations have dissipated. At stage B, the button is depressed, a magnetic field is generated around the solenoid, causing plunger to begin to accelerate towards a first resonator. At stage C, because the system is underdamped (e.g., not enough resistance to stop the plunger from moving), the plunger strikes the first resonator causing a first tone in the doorbell chime sequence. At stage D, the plunger bounces off of the resonator, but reaches equilibrium while it remains in the magnetic field. Typically, the point of equilibrium may be close to but not in contact with the resonator, due to the damping effect. The plunger may continue to vibrate, which may manifest in a continued audible hum if the plunger continues to make some contact with the resonator. Other sources of vibration may include 60 cycle hum, as would be appreciated by one of ordinary skill in the art with the benefit of this disclosure.

In the deactivation cycle, when the button is released and AC current is no longer flowing through the solenoid, the plunger may begin to accelerate back to its idle position (stage E). The acceleration may be provided by a restoring force in a compressed spring (326) coupled to the plunger. At stage F, the plunger passes through the idle state location due to the restoring force of the spring and the underdamped system and strikes the second resonator causing a second tone in the doorbell chime sequence. At stage G, the plunger bounces off the second resonator and may oscillate at its natural self-resonant frequency as a result of the collision. This can be a typical decaying oscillation of an underdamped "mass, spring, dashpot" system. At stage H, the plunger returns to the idle state as the force stored in the spring dissipates and the friction of the underdamped system damps the remaining vibrations.

As described above, some contemporary systems are configured to piggyback on to existing doorbell systems to incorporate additional functionality, such as video capabilities and the like. The challenge is to extract enough power during periods where the doorbell button is not pressed to properly bias and drive the additional systems without causing the doorbell chime device to ring.

Bridge Rectifier-Based Doorbell Systems

In some cases, a bridge rectifier circuit may be incorporated to provide filtered direct current (DC) power to a load (e.g., video system). However, bridge rectifier-based topologies often exhibit sub-optimal performance characteristics that often result with inadvertent bell ringing, bell "buzzing," insufficient power sourcing (particularly for 8V step-down transformers, which are common in Europe), and other performance issues.

Figure 5:
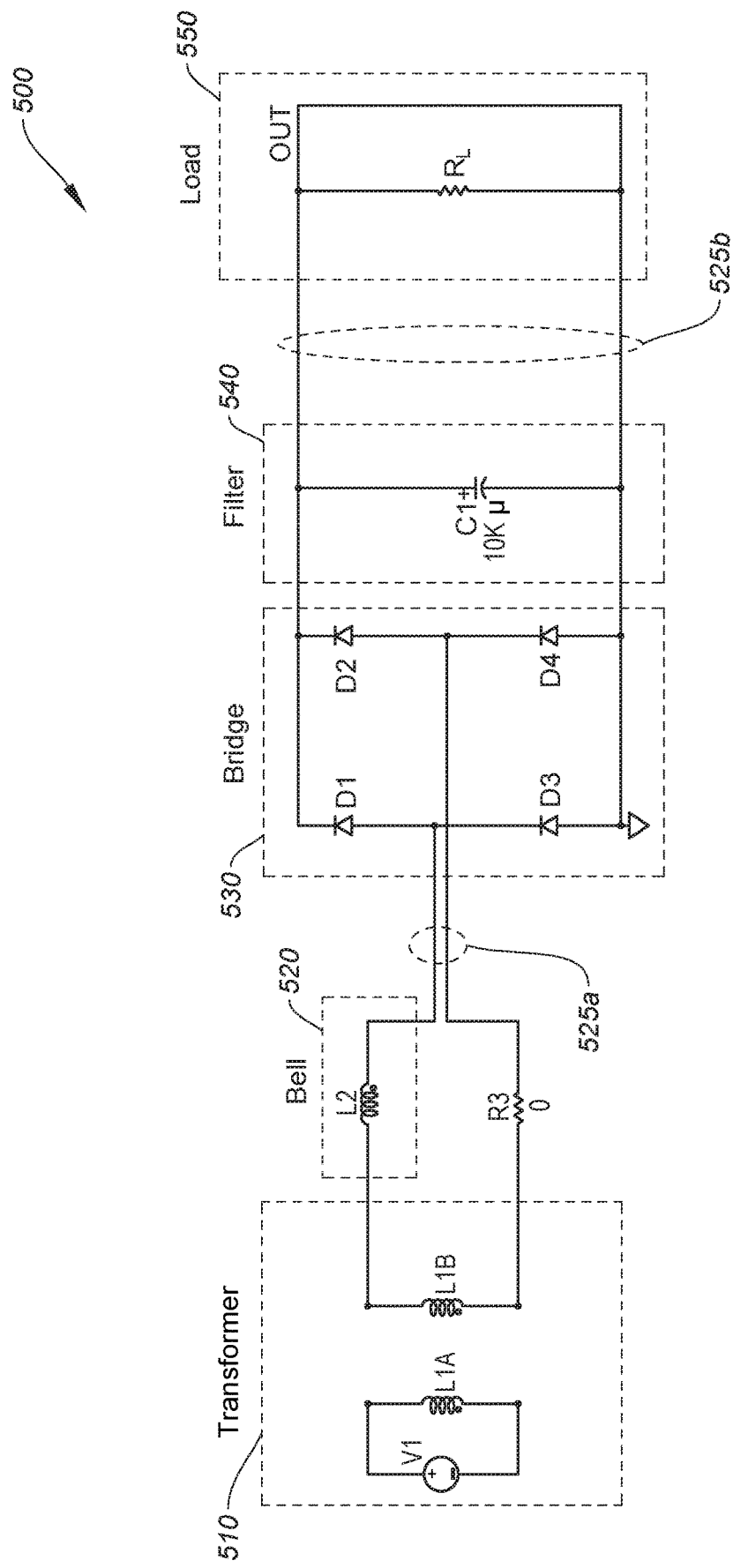
FIG. 5 shows a simplified electrical schematic of a doorbell system incorporating a bridge rectifier topology to power a load.

FIG. 5 shows a simplified electrical circuit schematic of a doorbell system 500 incorporating a bridge rectifier topology to power a load. Doorbell system 500 may include a transformer/power supply 510, a bell circuit 520, a doorbell button 525a/b, a bridge rectifier 530, a filter 540, and a load 550. Transformer/power supply 510 can include power supply V1 and transformer L1. Bell circuit 520 may be a mechanical chime device, or other suitable chime device (e.g., digital chime, wireless chime, etc.). For the purposes here, bell circuit is represented by inductor L2, corresponding to an internal solenoid, as described above. Transformer/power supply 510 and bell system 520 may be similar to the power supply, transformer, and bell systems described above with respect to FIGS. 2-4. Button 525a/b may be located on the input (525a) or output (525b) of the bridge rectifier circuit, as shown. When button 525 is pressed (in either location), the bridge rectifier, filter, and load are effectively bypassed (e.g. shorted out) thereby maximizing the current passing through the bell circuit and generating a chime. When button 525 is not pressed, the bridge rectifier, filter, and load are reintroduced back into the circuit. It can be assumed that the operation of doorbell system 500 corresponds to periods of time where the button is not pressed.

Bridge rectifier circuit 530 operates to rectify an AC input voltage and generate a DC voltage, as would be appreciated by one of ordinary skill in the art with the benefit of this disclosure. Bridge rectifier circuit 530 may comprise four diodes D1-D4 configured in a standard full-wave bridge rectifier topology. Filter 540 may include capacitor C1 and/or other circuit elements (typically capacitors, resistors, and inductors) and is typically configured to filter (reduce) voltage ripple present in the rectified DC voltage. A filter circuit may or may not be present. Load 550 ($R_L$) is shown in a simplified form for the purposes of explanation, but may comprise numerous circuit elements and multiple systems (e.g., audio, video, sensor, additional derived power supplies, etc.).

During operation when the button is not activated, current only flows through the bell circuit 520 (e.g., through solenoid 324) when the AC input voltage rises above the rectified DC output level ("Vout") across the load. For example, the AC input voltage may be 16V at L1B (e.g., assuming a 16 V step down transformer), which is rectified by bridge rectifier 530. The clipped Vout may drive the load and charge one or more capacitors (e.g., C1) at the output. The load may cause the clipped Vout to droop in response to a power requirement. Thus, during instances near the peak of a AC input voltage where the AC input voltage is higher than the voltage at Vout (e.g., the voltage across the bridge rectifier, filter, and load), the bridge diodes may be forward biased causing current to begin flowing through solenoid L2. This rapid change in current can manifest as very quick, large current spikes with large dead zones (e.g., periods of no conduction as discussed below with respect to FIGS. 9-10) that can very readily cause the bell circuit to inadvertently chime or buzz as the current flow through the solenoid directly corresponds to how much force is applied to the plunger. As further discussed below, the plunger is typically turned on and off at a rate of 120 times/sec (60 Hz operation, 2 phases) and increases in current draw (via a larger power load) tend to cause a steeper (faster change) waveform. Thus, the plunger may lift and fall rapidly in response to the current spikes causing the plunger to repeatedly strike the resonator (e.g., 120 times/sec), resulting in an audible "buzz." In some bridge rectifier-based doorbell circuits, this typically occurs with loads drawing approximately 1-1.5 W or less. In some systems, a DC-DC buck converter is used to lower the output voltage and increase the current through the load, however such systems still suffer from the issues described above. Bridge rectifier-based doorbell systems are not able to operate on systems with 8 V transformers (due to voltage droops), provide no system control over the bridge voltage, and have limited power delivery before inadvertently ringing the chime due to the fast/large current spikes and large dead times.

Boost Rectifier-Based Doorbell Systems

Figure 6:
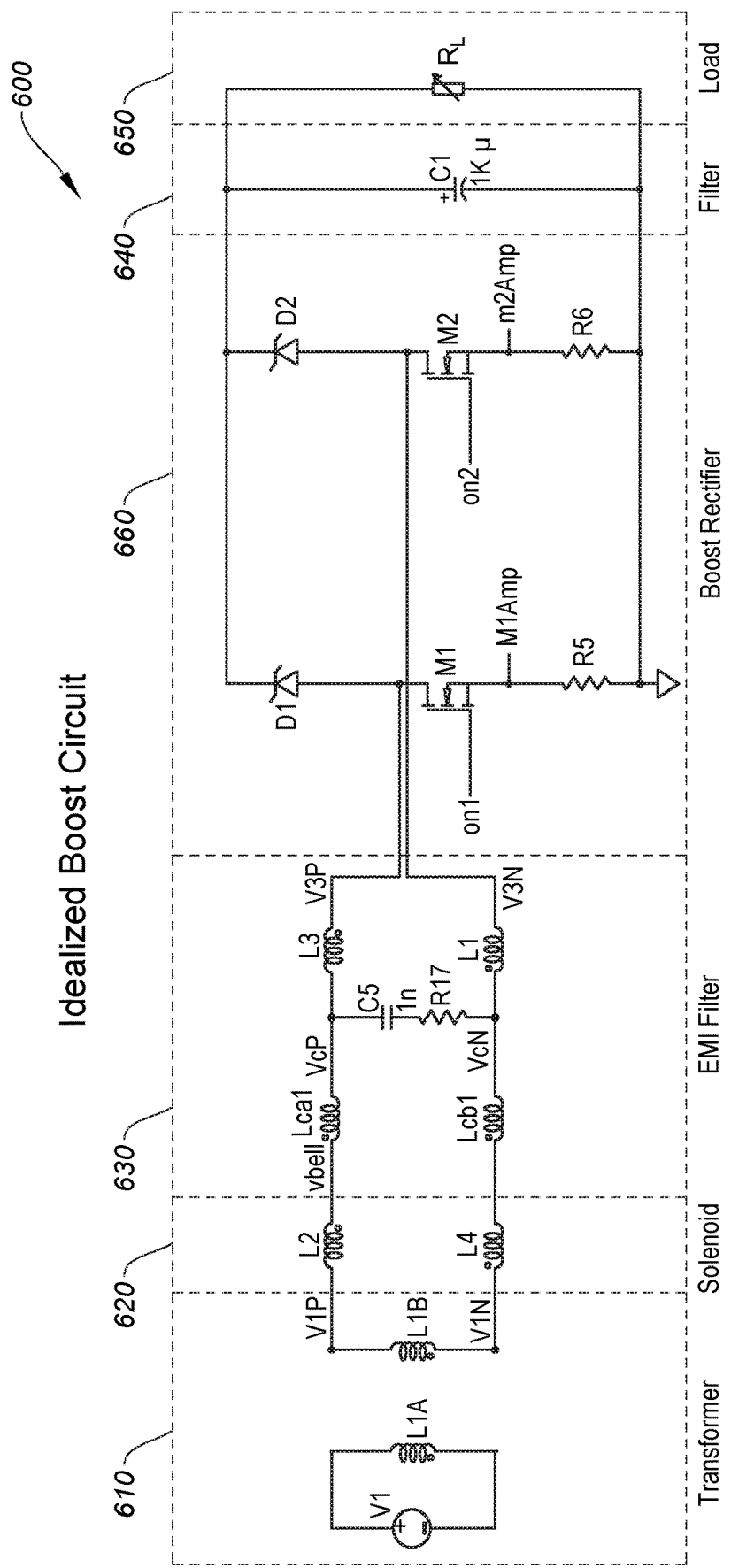
FIG. 6 shows a simplified electrical schematic of a doorbell system using a boost rectifier circuit topology, according to certain embodiments.

FIG. 6 shows a simplified electrical circuit schematic of a doorbell system 600 using a boost rectifier circuit topology, according to certain embodiments. Doorbell system 600 may include a transformer/power supply 610, a bell circuit 620, an electromagnetic interference (EMI) filter 630, a boost rectifier 660, an output filter 640, and a load 650. Transformer/power supply 610 can include power supply V1 and transformer L1. Bell circuit 520 may be a mechanical chime device, or other suitable chime device (e.g., digital chime, wireless chime, etc.). For the purposes here, bell circuit is represented by inductor L2, corresponding to an internal solenoid, as described above. Power supply V1, transformer L1, and bell circuit L2 may be similar to the standard transformer, power supply, and bell circuits described in FIGS. 2-4. The AC voltage across L1 (V1P to V1N) is typically 8 V, 16 V, or 24 V in most home doorbell systems. In some cases, additional inductor(s) (e.g., a high-Q inductor) may be used; particular in embodiments incorporating digital chime systems that do not include a solenoid, as shown and described below with respect to FIG. 27. It should be noted that various nodes (e.g., V1P, V1N, etc.) are included in many of the drawings and waveforms depicted in the figures and are included to provide a point of reference for different circuit locations (e.g., V1P is the positive side of the output of step-down transformer L1, etc.) to provide for easier reference and context. Such notations in the circuit diagrams (e.g., FIGS. 5, 6, 18-21, 27) and waveforms (e.g., FIGS. 10 and 12) would be understood and appreciated by one of ordinary skill in the art with the benefit of this disclosure. Although L4 is included in FIG. 6, some embodiments may not include an additional inductor L4 as it is not necessary to the operation of system 600 or any of the circuit topologies described herein. In some cases, L4 may be an additional solenoid found, e.g., in a dual solenoid, dual chime system (e.g., front/back door doorbell systems).

In some cases, EMI filter 630 may not be included in doorbell system 600. EMI filter 630 may be used to minimize radio frequency interference caused by the in-house bell circuit wiring acting as an unintentional long-wave radio antenna at the boost PWM carrier frequency and its harmonics. The EMI filter may include both series (L1, L3) and common mode (Lca1, Lcb1) chokes, and a series mode RC snubber (C5, R17). This is merely one embodiment of such a filter; many others exist, but a goal remains to minimize radiated emissions to comply with regulatory standards.

Boost rectifier circuit 660 (also referred to as a "pulse controlled boost rectifier" or "ac/dc boost converter") may include four active devices (also referred to as "active circuit elements," "active circuits," "active elements") including diode D1, diode D2, metal-oxide semiconductor, field-effect transistor (MOSFET) M1, MOSFET M2, and biasing resistors R5, R6. The cathodes of D1 and D2 are tied to Vout (e.g., the node across C1 of filter 640 and load 650) forming a "boost rail" node. The anode of D1 may be coupled to the drain of M1 and the a positive output of EMI filter 630 (V3P) or directly to the output of solenoid L2 (Vbell) if the EMI filter is not present. The anode of D2 may be coupled to the drain of M2 and the negative output of EMI filter 630 (V3N) or the negative side of the transformer (V1N) or additional inductor (VcN). Although M1 and M2 are shown as enhancement-mode MOSFET devices, depletion-mode MOSFETs, junction gate field-effect transistors (JFETs), p- or n-type bipolar junction transistors (BJTs), insulated-gate bipolar transistors (IGBTs), or other device capable of switching the current through the solenoid at a desired PWM frequency may be used, as would be appreciated by one of ordinary skill in the art with the benefit of this disclosure. The sources of M1 and M2 may be coupled to a signal and/or electrical ground through one or more resistors (R5/R6). The gates of M1 and M2 may be coupled to a driver circuit (e.g., a pulse width modulator), as further discussed below. In some embodiments, diodes D1 and D2 may be replaced by a FETs. For example, an FET has a "body diode" from drain-to-source that can be utilized to function in a similar manner as a discrete diode, as would be appreciated by one of ordinary skill in the art with the benefit of this disclosure. Different configurations of resistors, capacitors, and/or inductors may be incorporated at the node occupied by R5 and R6 to change biasing characteristics, add filtering effects, or the like, as would be appreciated by one of ordinary skill in the art with the benefit of this disclosure. For example, R5 may include a series-coupled resistor (e.g., 100Ω) and capacitor (e.g., 1 nF) configured in parallel with R5. Similarly, R6 may include a series-coupled resistor (e.g., 100Ω) and capacitor (e.g., 1 nF) configured in parallel with R6. It should be noted that although specific values of the various components are provided in the figures, other component selections may be used, as would be appreciated by one of ordinary skill in the art with the benefit of this disclosure.

Filter 640 may include capacitor C1 and/or other circuit elements (typically capacitors, resistors, and inductors) and is typically configured to filter (reduce) voltage ripple present in the rectified DC voltage. In some cases, a filter circuit may or may not be present.

Load 650 ($R_L$) is shown in a simplified form for the purposes of explanation, but may comprise numerous circuit elements and multiple systems (e.g., audio systems, video systems, sensor arrays, LEDs (e.g., IR), auxiliary power supplies, etc.).

In some embodiments, boost rectifier circuit 660 can provide a number of advantages and significant performance improvements over systems using a standard bridge rectifier topology (530), which are mentioned here as an overview and discussed in more detail in the figures that follow. For instance, a boost rectifier circuit can both boost and rectify an input AC voltage using the same circuit elements. Boost rectifier circuit 660 typically utilizes an energy storage element, such as an inductor, to facilitate the boosting of the amplitude of the input AC voltage. In some exemplary embodiments, boost rectifier circuit 660 advantageously uses the self-inductance of the mechanical chime device (e.g., solenoid L2), which can be as high as 7-20 mH or more, as well as self-inductance from the bell wires to provide some or all of its energy storage needs to boost the input AC voltage. Using higher inductance values can further help boost the input voltage, help reduce switching losses (e.g., switching the operation of M1, M2), and allows for lower switching frequencies, which can be easier to control and level, as further described below (see, e.g., FIG. 14). Alternatively or additionally, additional inductors from EMI filter 630 may further function as energy storage elements during the boost process. Note that some embodiments may rectify first and then boost Vin (using different circuit elements/topologies unlike system 600), however this has the disadvantage of delivering less available power to the load.

Boost rectifier circuit 660 can also eliminate the need for a mechanical switch (doorbell button), as the circuit topology allows for certain biasing conditions (e.g., turning on both M1 and M2 through their corresponding gates) that can perform the same function as a mechanical button in bypassing the additional load and supporting circuitry (e.g., shorting the vbell and V1N nodes) and causing a sharp increase in current through solenoid L2 to cause the bell circuit to chime. Although a two-tone ring is generally discussed throughout this disclosure, it should be understood that multi-tone ring patterns are possible (e.g., ringing resonators in differing patterns) as are chime devices with more sophisticated resonator arrays. For example, a video doorbell with facial recognition technology might select from several predefined ring patterns based on the identity of the person at the door. One of ordinary skill in the art with the benefit of this disclosure would understand the many variations, modifications, and alternative embodiments thereof and how certain embodiments could be applied thereto.

In some cases, boost rectification of the input AC voltage has a further advantage of pulse-shaping (e.g., lowering and flattening) the current through solenoid L2 from a sine wave to more of a square-wave shape, which provides the benefit of significantly reducing the peak current through the solenoid (less likely to cause the bell circuit to ring), increasing the amount of total power available to the load, and reducing the gap between current pulses (e.g., a shortened "dead space"), which can result in less plunger travel and vibration and may prevent the plunger from returning and striking the first resonator (323) due to the spring force between current pulses. More power is available to the load because more of the input voltage phase is available to drive the load in a square wave versus a sine wave, resulting in more energy under the curve. Recall that power can be extracted with Vin exceeds the boost rectifier output node (M1 and M2 are configured as inverters so the peaks of Vin occur during the valleys of Vout). Note that power is measured as energy per time unit (Watts=Joules/sec). Thus, more energy is available over a longer portion of time of each phase of the AC wave cycle. For instance, low voltage portions of each phase of the AC wave cycle (e.g., 2-5 V) which would be too low to drive current into the load in a standard bridge rectifier circuit due to the reverse bias voltage of the rectifier diodes, can be boosted to higher voltages (e.g., 40-45 V) in a boost rectified circuit, allowing that portion of the AC cycle to provide power to the load, as further described below.

In some embodiments, boosting to a higher voltage may also reduce $I^2R$ power losses in the solenoid and house wiring because the crest factor (the ratio between peak and rms) of the current is lower. The boost rectifier circuit also allows for precise control over the amount of boost as well as gradual changes in current (versus steep current spikes, which are uncontrollable in a standard bridge circuit), which can improve battery charging capabilities (e.g., for alkaline, lithium-ion, Ni-Cad, etc., type battery packs) and more control over the operation of the chime circuit. For instance, in a charging cycle of a battery pack, the boost may be increased accordingly to pull more power than needed by the load to simultaneously charge the battery pack. Once the battery pack is fully charged, the boost can be lowered to match accommodate the load requirement. In a di/dt (change in current) context, a battery system can supplement or replace the load when the load drastically changes (e.g., video is turned off) to avoid a rapid change in current through solenoid L2. Alternatively or additionally, boost rectifier circuit 660 can gradually or rapidly change the boost to help lessen a fast di/dt for solenoid L2, as would be appreciated by one of ordinary skill in the art with the benefit of this disclosure. Transistors M1, M2 can be biased to emulate a diode across a button (often a complicated install process for a special circuit configured at the chime location) that is typically needed for doorbell systems with electronic ringers, such that a maximum power can be pulled by the system when needed to cause the bell system to ring when needed.

In operation, transistors M1, M2 can be pulsed (biased) in a manner that boosts Vout to a higher voltage than Vin (input AC voltage) across the transformer (e.g., 16 VAC), and maintains Vout at a fixed point with fast switching between voltage phases (e.g., positive and negative excursions) to make for a short "dead time." The dead time may refer to the period between current pulses in the solenoid that are low enough (e.g., less than 10 mA), such that the spring force overcomes the force provided by the electromagnetic field of the solenoid and causes the plunger to strike the resonator. If the dead time is short enough, the plunger will not have enough time to strike the resonator before another positive or negative pulse comes to reintroduce the magnetic field. Transistors M1, M2 may be biased in different ways to achieve the desired boost voltage. For instance, in some embodiments, M1 may be pulsed during a first half cycle ("phase A") of the AC input voltage, while M2 is biased on (e.g. continuous voltage applied during phase A), and M2 may be pulsed during a second half cycle ("phase B") of the AC input voltage, while M1 is biased on. Different biasing schemes can be used (e.g., for depletion mode MOSFETs), as would be appreciated by one of ordinary skill in the art with the benefit of this disclosure. In some implementations, boost rectifier circuit 660 typically boosts Vin to a maximum of approximately 40-45 V, which is typically an upper limit for bell wiring per the electrical code common to most jurisdictions.

The biasing of each transistor M1, M2 can be implemented via a pulse-width modulator (PWM) circuit controlled by a microcontroller (e.g., of system 1400). In some cases, the microcontroller can control the AC/DC conversion and boost in real-time (see a further discussion below at least with respect to FIGS. 14 and 22-24). The duty cycle of the pulses on each of M1, M2 may be partially dependent on Vin vs. Vout. Unlike a typical boost converter circuit (not to be confused with boost rectifier 660), which directly controls/picks a pulsing duty cycle, M1 and M2 can be pulsed, in certain embodiments, based on a sensed current through solenoid L2. For instance, the microcontroller can set a current limit for the solenoid based, in part, on Vin/Vout and the load requirement, and M1/M2 may charge via a pulsed voltage input (Vpulse) in their corresponding phases (thus boosting Vin), which ramps up the current until the current limit sensed across L2 is reached. When the current limit is reached, M1/M2 may then subsequently turn off, causing the current to begin ramping down. The microcontroller may then set another current limit (or maintain a present value) for the next Vpulse based on Vin/Vout and the load requirement and the charge/discharge current ramp is repeated. This repeated train of charge/discharge ramps may dictate the shape of the duty cycle of Vpulse (see., e.g., FIGS. 22-23). In some cases, the current across L2 can be sensed by measuring a voltage drop across R5 and R6, which may have a similar current as they are part of the conduction path for each charge/discharge period for each phase, as further shown and described below with respect to FIG. 18-21. In some embodiments, the microcontroller may set a current limit using a digital-to-analog converter (DAC) and compare a present current through L2 via a comparator, as shown, e.g., in FIG. 14.

In some embodiments, boost rectifier 660 may slowly ramp up Vout over time (1-5 s) to prevent a sharp spike in current (e.g., through L2) after the doorbell button is released and avoid ringing the chime circuit. For instance, while the doorbell button is pushed, boost rectifier 660 may be bypassed to drive solenoid L2 with maximum power from the transformer with no power being applied to the load (not including a battery circuit). After releasing the doorbell button, a large power spike can occur as the boost rectifier circuit begins charging again to provision the load. In some cases, the power ramping process may be gradually increased to prevent a sharp spike, as shown and described below with respect to FIG. 13.

In further embodiments, boost rectifier circuit 660 can be configured to perform diagnostic measurements, self-calibration, and auto-discovery of a home transformer/wiring infrastructure without needing additional circuitry. For example, a smart device (e.g., a smart phone) may be used once a boost rectifier-based system is installed to listen (e.g., via microphones) to detect if a hum or buzz is present and adjust a current limit setting accordingly to mitigate or eliminate it. In some cases, a ringing can be determined by detecting changes in the efficiency of solenoid L2 caused by eddy currents and/or changes to the inductance and Q factor of L2 as the plunger passes through it. In some cases, a charge/discharge rate on capacitors at the input can be detected and, due to an inductors resistance to changes in current, sharp spikes in current may indicate that no inductor is at the input, and thus no solenoid-based chime circuit is being used (e.g., a digital chime may be used in the doorbell system, as shown and described below with respect to FIG. 27).

As indicated above, FETs have a built-in body diode that cause the FET to operate as a diode when the FET is turned off (not forward biased). Thus, the boost rectifier circuit may be biased to operate as a bridge rectifier when M1 and M2 are turned off. The bridge will stabilize at approximately Vin (minus forward biasing losses), which can be measured at Vout to determine what type of step-down transformer is being used (e.g., 8/16/24 V).

Managing $\Delta di/\Delta dt$ in a Chime Device Solenoid

Figure 7:
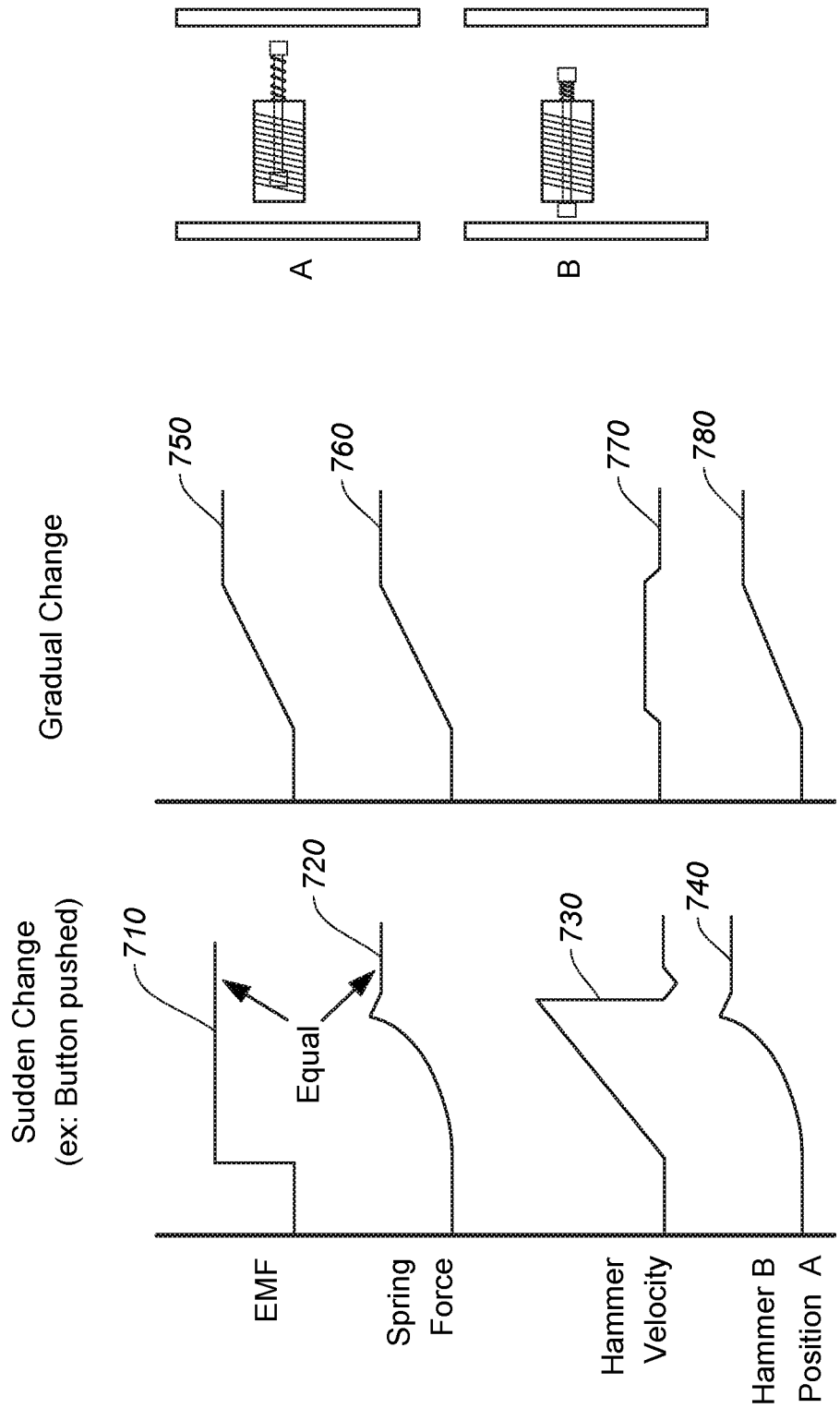
FIG. 7 shows various performance effects of a mechanical chime in response to different current profiles.

FIG. 7 shows various performance effects of a mechanical chime device in response to different current profiles. When there is a sudden change in current ($\Delta di/\Delta dt$), the velocity of the plunger can ramp up and overshoot past the point of equilibrium, thereby striking the bell plate (resonator). However, when there is a gradual change in $\Delta di/\Delta dt$, both the velocity and acceleration of the plunger can remain low, such that the plunger may not overshoot and thus avoid striking the bell plate. The discussion of FIG. 7 refers to concepts described above with respect to FIGS. 2-4.

To illustrate, when a button is pressed is a typical doorbell system (e.g., doorbell system 200), the electromotive force (or EMF, which is the energy produced by the interaction between a current and a magnetic field when one (or both) is changing) across inductor L2 may change immediately in a step-wise fashion (see 710). In response, the plunger ("hammer"), starting at position A (equilibrium point where spring force is low and EMF is low), moves very quickly at an increasing velocity through the solenoid (see 730) causing the spring force to increase at an increasing rate until the plunger overshoots an equilibrium state, strikes the resonator, bounces off and reaches an equilibrium at position B (where spring force and EMF is high) when the EMF and spring force are equal (see 720 and 740). Note that the plunger does not move at equilibrium (other than due to underdamped oscillations).

If the EMF is changed gradually (see 750) across inductor L2 initially at position A, the spring force also increases gradually with no overshoot (see 760), the plunger velocity increases slightly and maintains a low velocity (see 770) until equilibrium at position B is achieved. A similar effect may occur in response to a sudden removal of EMF. FIG. 7 illustrates how a gradual change in energy through the solenoid can prevent overshoot, which can help prevent inadvertent ringing of the chime circuit when provisioning a quickly changing load.

Figure 8:
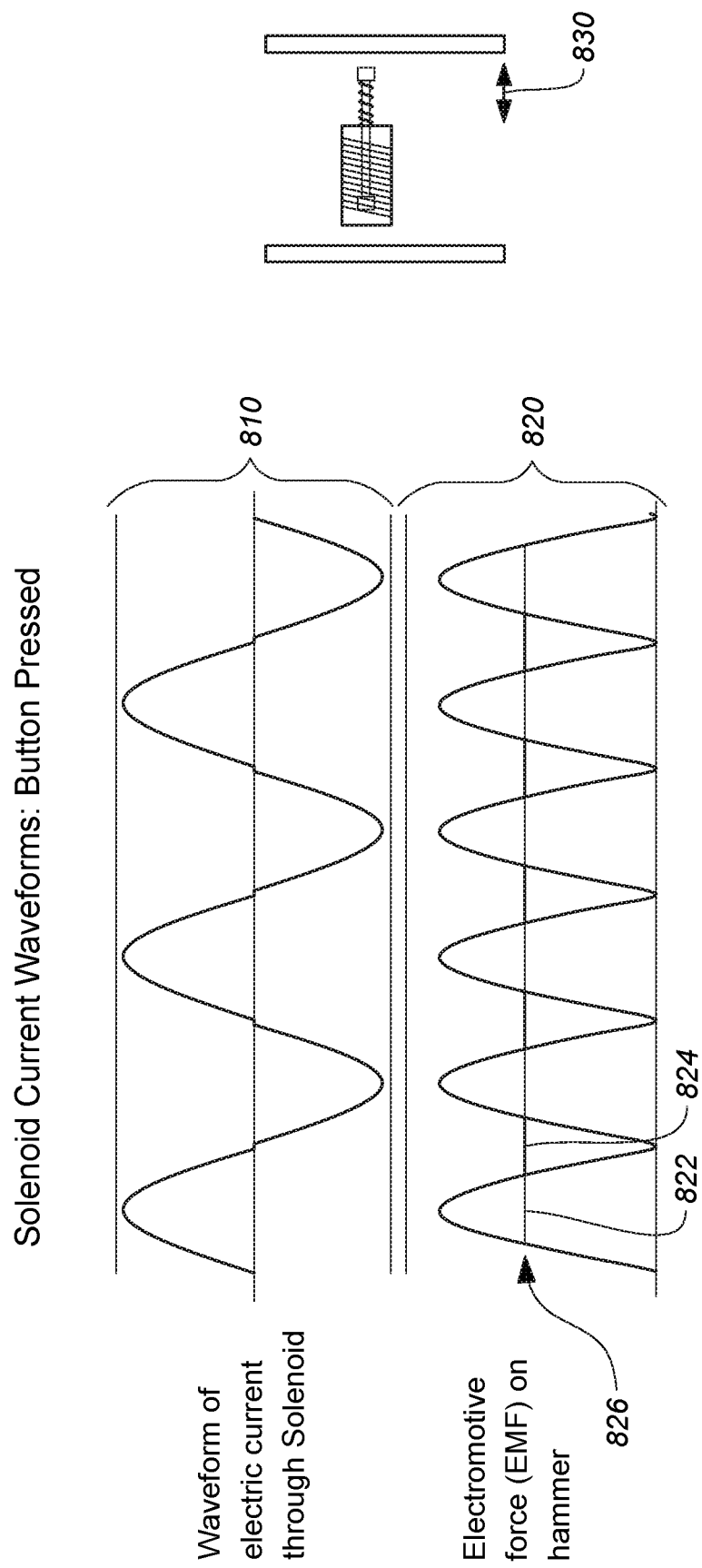
FIG. 8 shows solenoid current and electromotive force waveforms for a chime device when a doorbell button is pressed.

FIG. 8 shows solenoid current and electromotive force waveforms for a chime device when a doorbell button is pressed. Waveform 810 corresponds to a waveform of an electric current through a solenoid, such as L2, when the doorbell button is pressed. Waveform 820 corresponds to an EMF on a plunger (328). Note that the plunger in doorbell circuits are typically not magnetized, so solenoid current in both positive and negative excursions cause the plunger to be pulled into the solenoid.

Line 826 may correspond to the point of equilibrium between the EMF on the plunger and the restoring force provided by the spring. During phase A (positive excursion) of the current waveform through solenoid L2, the EMF begin accelerating the plunger into the solenoid at region 822. At region 824, the spring may begin accelerating the plunger. Note that the percentage of total time that the spring accelerates the plunger is large (see plunger motion 830), which ensures that the plunger will overshoot beyond equilibrium (point B, FIG. 7) and strike the resonator.

Figure 9:
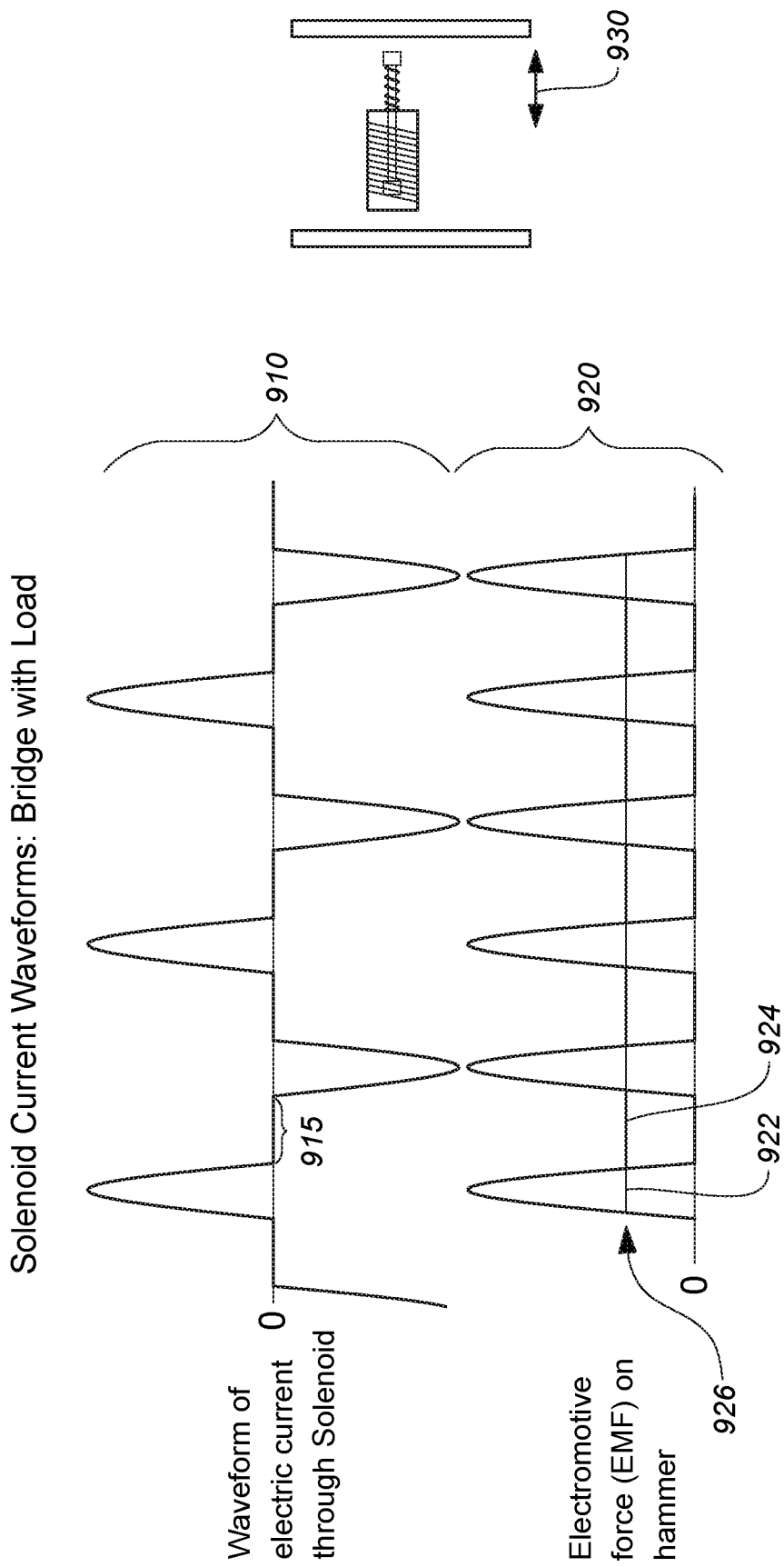
FIG. 9 shows solenoid current and electromotive force waveforms for a chime device in a bridge rectifier-based doorbell system with an electrical load.

FIG. 9 shows solenoid current and electromotive force waveforms for a chime device in a bridge rectifier-based doorbell system with an electrical load, such as doorbell system 500 of FIG. 5. Waveform 910 corresponds to a waveform of an electric current through solenoid L2 of system 500, when the doorbell button is not pressed and bridge rectifier circuit 530 is provisioning load 550. Note that the peaks of the AC waveform (Vin) are clipped to produce power. RMS power, which is the area under the curve (times the voltage) is very low compared to the peak current, and thus relatively little power can be generated (e.g., 1-1.5 W or less).

The pulses in waveform 910 can correspond to instances near the peak of an AC input voltage where the AC input voltage is higher than the voltage at Vout (e.g., the voltage across the bridge rectifier, filter, and load), and current immediately flows through inductor L2. This rapid change can manifest as very quick, large current spikes in current through L2 with large dead zones 915 that can very readily cause the bell circuit to inadvertently chime or buzz. The plunger is typically turned on and off at a rate of 120 times/sec (60 Hz operation, 2 phases) and increases in current draw (via a larger power load) tend to cause a steeper (faster change) waveform. Thus, the plunger may lift and fall rapidly in response to the current spikes causing the plunger to repeatedly strike the resonator (e.g., 120 times/sec), resulting in an audible "buzz." In some bridge rectifier-based doorbell circuits, this typically occurs with loads drawing approximately 1-1.5 W or less, as mentioned above.

Waveform 920 corresponds to an EMF on the plunger (328). Line 926 may correspond to the point of equilibrium between the EMF on the plunger and the restoring force provided by the spring. During phase A of the current waveform corresponding to solenoid L2, the EMF begins accelerating the plunger into the solenoid at region 922. At region 924, the spring may begin accelerating the plunger. Note that the percentage of total time (dead time 915) that the spring accelerates the plunger is very large (see plunger motion 930), which will be highly likely to cause the plunger will overshoot beyond equilibrium (point B, FIG. 7) and strike the resonator.

Figure 10:
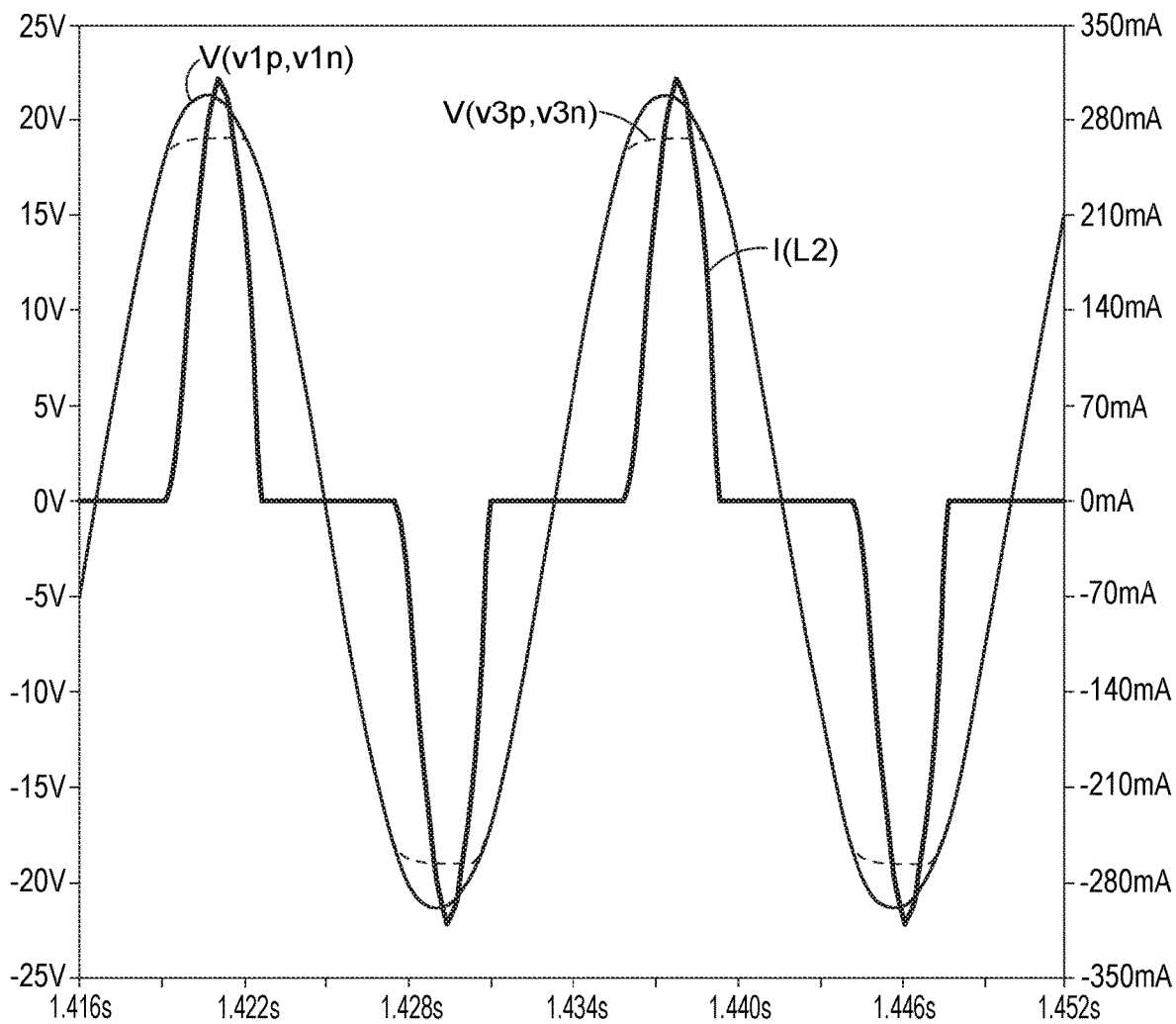
FIG. 10 shows a simplified waveform showing voltage and current for a chime device solenoid using a bridge rectifier circuit topology and electrical load.

FIG. 10 shows a simplified waveform showing voltage and current for a chime device solenoid using a bridge rectifier circuit topology and electrical load, such as doorbell system 500 of FIG. 5. V1(v1p, v1n) may correspond to the voltage across transformer L1, V2 (v3p, v3n) may correspond to the voltage at the input of the bridge rectifier, and I(L2) may correspond to the current through solenoid L2. Note the sharp, narrow current spikes corresponding to periods where power is supplied to the load. The maximum current exceeds 300 mA, although the short periods of power delivery limit the total amount of power that can be generated. As shown in FIG. 10, the effective load can draw 1.34 W given low amount of energy under the curve at the input (note—power into the system is equal to power out). Note that the large current spikes cause the plunger to move away from the first resonator (position A) at a rate that will likely overshoot equilibrium (position B) and strike the second resonator. Further, the long dead times allow enough time for the spring force to return the plunger to and strike the first resonator as well. This process may occur at 120 Hz, potentially causing a very loud, constant, buzzing/ringing of the chime circuit while the doorbell button is not depressed.

FIG. 11 shows solenoid current and electromotive force waveforms for a chime device using a boost rectifier circuit topology and electrical load, such as doorbell system 600, according to certain embodiments. Waveform 1110 corresponds to a waveform of an AC electric current through solenoid L2 of system 600, when the doorbell button is not pressed and boost rectifier circuit 660 is provisioning load 650. Note that a square wave current provides the most power for a given peak current. The RMS power for the approximate square wave of waveform 1110 can be very high as compared to bridge rectifier topologies. Power delivered to the load may be as high as 3-4 W or more.

The pulses in waveform 1110 can correspond to periods of time near the peak of an AC input voltage where the AC input voltage is higher than the voltage at Vout (e.g., the voltage across the bridge rectifier, filter, and load), and current flows through inductor L2. Waveform 1120 can correspond to an EMF on the plunger (328). Line 1126 may correspond to the point of equilibrium between the EMF on the plunger and the restoring force provided by the spring. During phase A of the current waveform corresponding to solenoid L2, the EMF begins accelerating the plunger into the solenoid at region 1122. At region 1124, the spring may begin accelerating the plunger. Note that the percentage of total time (dead time 1015) that the spring accelerates the plunger is very small (see plunger motion 1130), which will be highly likely to prevent the plunger will overshooting beyond equilibrium (point B, FIG. 7) and striking the resonator. Thus, the plunger will not have enough time to move back to position A and can therefore remain suspended between the resonators.

FIG. 12 shows a simplified waveform showing voltage and current for a chime device solenoid using a boost rectifier circuit topology and electrical load, such as doorbell system 600 of FIG. 6, according to certain embodiments. V1(v1p, v1n) may correspond to the voltage across transformer L1, V2 (v3p, v3n) may correspond to the voltage at the input of the bridge rectifier, and I(L2) may correspond to the current through solenoid L2 of system 600 (also referred to as the "input current" of the system, or IL2). Boost rectification, as described above, can facilitate pulse-shaping the current through solenoid L2 into a square-wave to significantly reduce the maximum current through the chime device solenoid, increase the amount of total power available to the load, and reduce the gap between current pulses (e.g., less dead space), which can result in less plunger travel, vibration, and/or eliminate the plunger from striking the resonator due to the spring force between current pulses. More power is available to the load because more of the input voltage phase is available to drive the load in a square wave versus a sine wave, resulting in more energy under the curve. This is evident when compared to the solenoid current of a bridge rectified system. At 60 Hz, one phase (e.g., positive phase) of Vin is approximately 8.3 ms. Referring to FIG. 10, solenoid current L2 does not begin ramping up until about 3 ms into the first phase. In contrast, FIG. 12 illustrates how solenoid current in L2 in a boost rectified system begins ramping solenoid current L2 almost immediately (less than 0.5 ms) and reaches about half of the maximum current at about 1 ms. Furthermore, the maximum current through L2 is less than 200 mA, as compared to a peak L2 current in FIG. 10 at over 300 mA. Thus, the plunger moves less. Since L2 current is spread over a longer duration, and power in equals power out, a lower maximum current on L2 and much higher output power are attainable (power in=power out).

Figure 13:
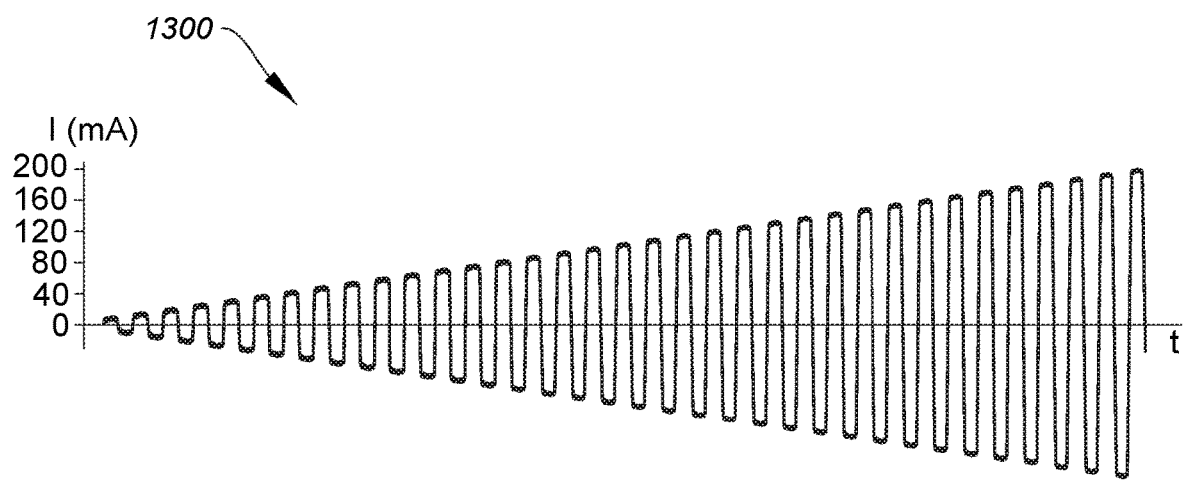
FIG. 13 shows a start-up current waveform for an electric load in a doorbell system using a boost rectifier circuit topology, according to certain embodiments.

FIG. 13 shows a start-up current waveform 1300 for an electric load in a doorbell system using a boost rectifier circuit topology, according to certain embodiments. In some instances, there may be large changes in a load (e.g., a video circuit is enabled or shutoff, a suite of sensors are powered up, a loudspeaker is powered up, etc.), which my result in a large change in Δdi/Δdt. In some implementations, AC current in the solenoid may be ramped up and down slowly (e.g., in a step-wise manner) to manage Δdi/Δdt. Waveform 1300 shows an example of the solenoid current in L2 ramped up at a slow rate, which may extend over any number of cycles (e.g., 100-500 ms, 1-5 s, etc.). This gradual change in chime circuit solenoid current can prevent inadvertent ringing of the chime circuit due to current-induced plunger velocity and overshoot, as illustrated in FIG. 7.

Figure 14:
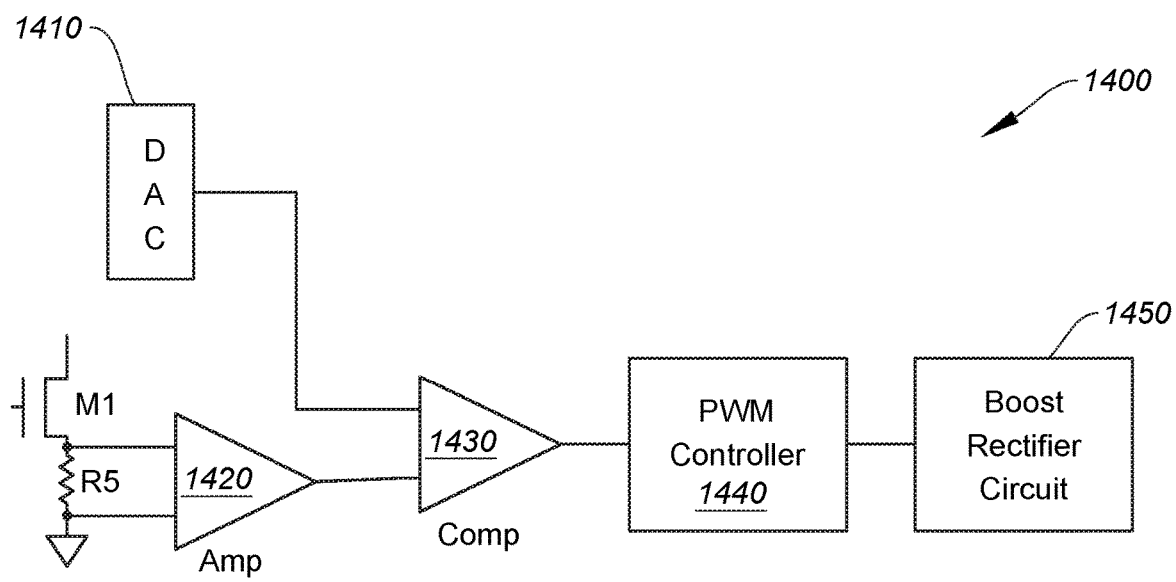
FIG. 14 shows a current limiter and driver system 1400 for a boost rectifier circuit, according to certain embodiments.

One method of controlling the current through the chime device solenoid is by way of a PWM-based drive system for M1/M2 (see FIG. 6). FIG. 14 shows a simplified representation of a current limiter and driver system ("System") 1400 for a boost rectifier circuit, according to certain embodiments. System 1400 may include a digital-to-analog converter (DAC) 1410, a current sense amplifier 1420, a comparator 1430, and a PWM 1440, which drives boost rectifier circuit 1450. In some embodiments, boost rectifier circuit 1450 may correspond to boost rectifier circuit 660 of FIG. 6. Current sense amplifier 1420 may measure the current through bias resistors (resistors tied between the source of M1/M2 and electrical ground) in the boost rectifier circuit 660 of FIG. 6. As noted above, and as illustrated in FIGS. 18-21, the current through L2 may be the same or substantially the same as the current through R5/R6, so sensing a current through the resistors can effectively provide an accurate measurement of the current through solenoid L2 (as well as other series-coupled inductance, such as optional high-Q inductor(s) L4).

Ramping the solenoid current (input current) IL2 may occur over long periods (e.g., 1-5 s when the system is initially powered up and IL2 has substantially zero current flow), or shorter period (e.g., 1-100 ms) where IL2 changes due to comparatively smaller changes in a power requirement in the load (e.g., night vision IR LEDs are powered on in a video doorbell system). To control the current through L2, a microcontroller (or processor) may set DAC 1410 to a low voltage, which can be slowly increased over time. Comparator 1430 compares a voltage drop across R5/R6 (which corresponds to IL2) to the DAC voltage and drives PWM controller 1440 with the output. Typically, when the voltage detected across R5 or R6 is less than the DAC voltage, PWM controller 1440 can begin charging M1 or M2 of boost rectifier circuit 1450 (applying a bias voltage at the gate of M1 or M2). Conversely, when the voltage detected across R5 or R6 is the same as or greater than the DAC voltage, PWM controller 1440 may stop charging boost rectifier circuit 1450 (e.g., removing the bias voltage on the gate of M1/M2). The starting and stopping of the output of PWM controller 1440 results in a voltage pulse train on M1/M2 with a duty cycle based, in part, on the sensed current through L2 and Vout/Vin. As mentioned above, the DAC may be set to incrementally increasing values to ensure that the current through L2 ramps gradually as opposed to sharp spikes, which may cause bell circuit ringing or buzzing. The application and removal of the pulsed bias voltage on M1/M2 causes IL2 to ramp up and ramp down accordingly. This may occur many time during the course of a single AC cycle, as shown and described below with respect to FIG. 22-23, which ultimately affords excellent real-time, high-resolution control of the boost rectification of Vin, the current through L2, the output voltage (Vout).

Figure 22:
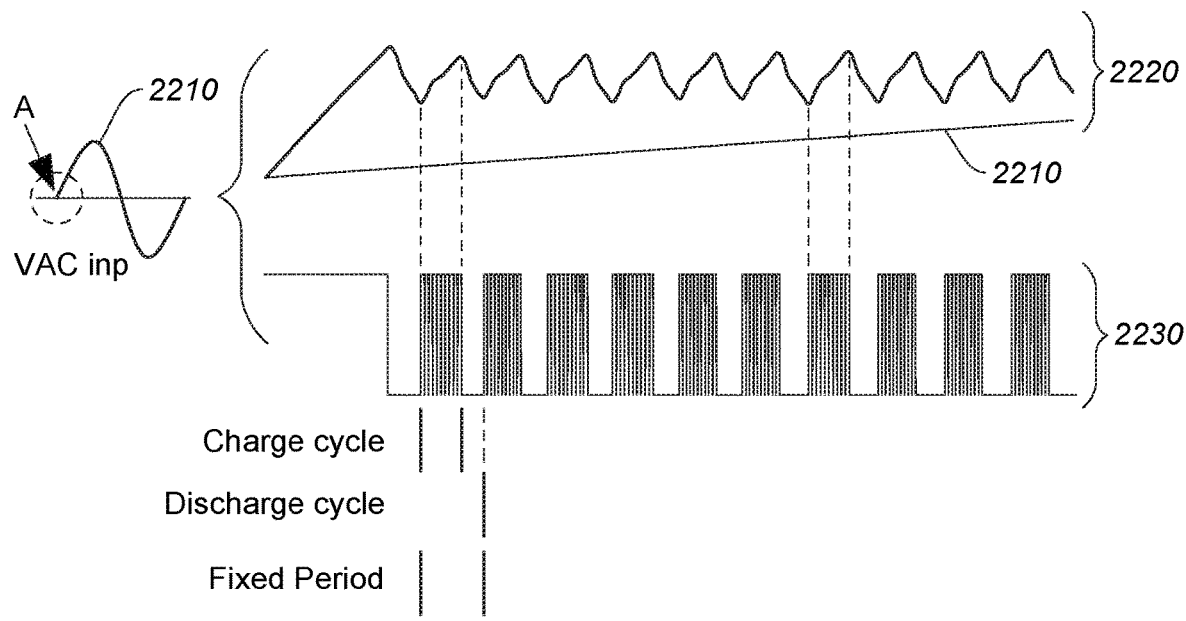
FIG. 22 shows a charge/discharge waveform for a boost rectifier circuit implemented by a pulse-width-modulator-based drive system during a low-amplitude phase of an AC input voltage, according to certain embodiments.
Figure 23:
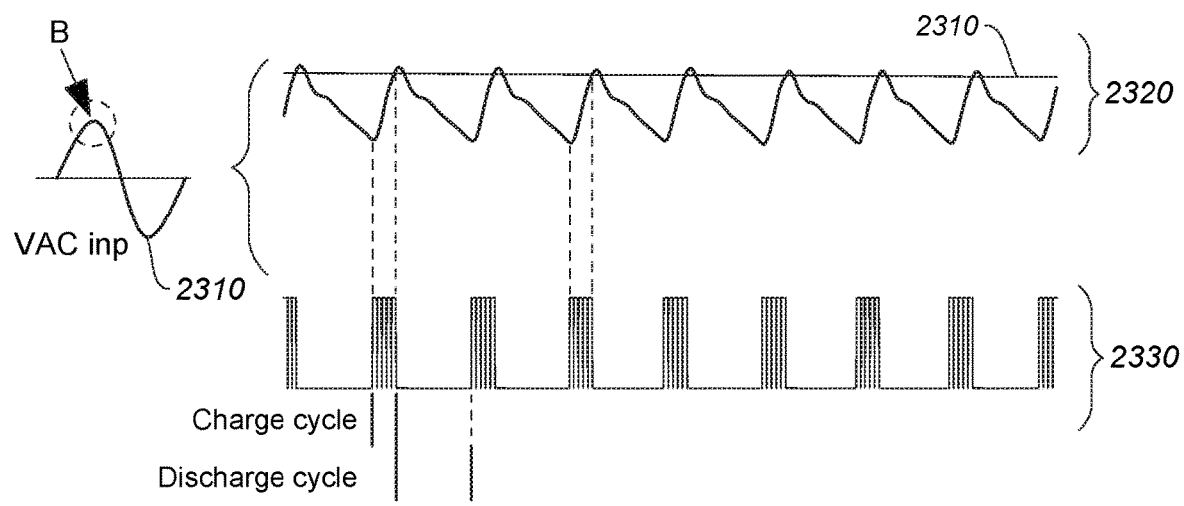
FIG. 23 shows a charge/discharge waveform for a boost rectifier circuit implemented by a pulse-width-modulator-based drive system during a high-amplitude phase of an AC input voltage, according to certain embodiments.

In some cases, MOSFETs M1/M2 can be turned on and off via PWM controller 1440 based on the measure current through L2. During a typical single AC input cycle, a series of on/off biasing voltages on M1/M2 will manifest as a series of ramp up/ramp down current in L2 (e.g., typically 10-100 ramp up/down cycles, although other values are possible). DAC 1410 may be set based on the load, such that if the load is increasing, DAC 1410 may be set incrementally higher, and if the load is decreasing, DAC 1410 can be set incrementally lower, thus ensuring gradual changes in IL2, as shown in FIGS. 22-23. Thus, the duty cycle of the biasing (the voltage pulse train) of M1/M2 is modulated as a consequence of the current limiting set at the DAC. In some embodiments, a fixed start point and a variable stop point may be set for DAC 1410, such that M1/M2 (e.g., M1 during the positive phase of the AC input, and M2 during the negative phase) is driven (IL2 current ramps up) until the current limit is reached, and then it is turned off (IL2 current ramps down). During the next cycle, a new current limit can be set via DAC 1410, and the process repeats. Thus, a variable duty cycle results that is controlled in real-time based on the changing load and the current through L2. This process may occur hundreds of times for each phase of a single 60 Hz input cycle. The rate at which the current limit is reached can depend on the voltage being boosted to (Vout) and the AC input voltage (Vin). For instance, the current limit is typically reached faster when Vin is high (during maximum excursions in Vin, requiring less boost to reach 40-45 V) and slower when Vin is low (when Vin is low), which pulse-shapes IL2 into a square wave (note that more boosting is need at low Vin and less boosting is needed at high Vin).

In some embodiments, Vout may be monitored to detect changes in the load, which can be used to modify the current limit set in system 1400. For example, when the load increases, more current may be drawn out of the output capacitor C1, which in turn may cause the voltage across C1 to droop. In response, the current limit may be increased to provide more power to the load and thereby push Vout back to a target range or value (e.g., 40-45 V). When the load decreases, Vout may begin rising and the current limit set by system 1400 may be reduced so less total energy is provided at Vout, resulting in a drop in Vout to the target value.

Figure 15:
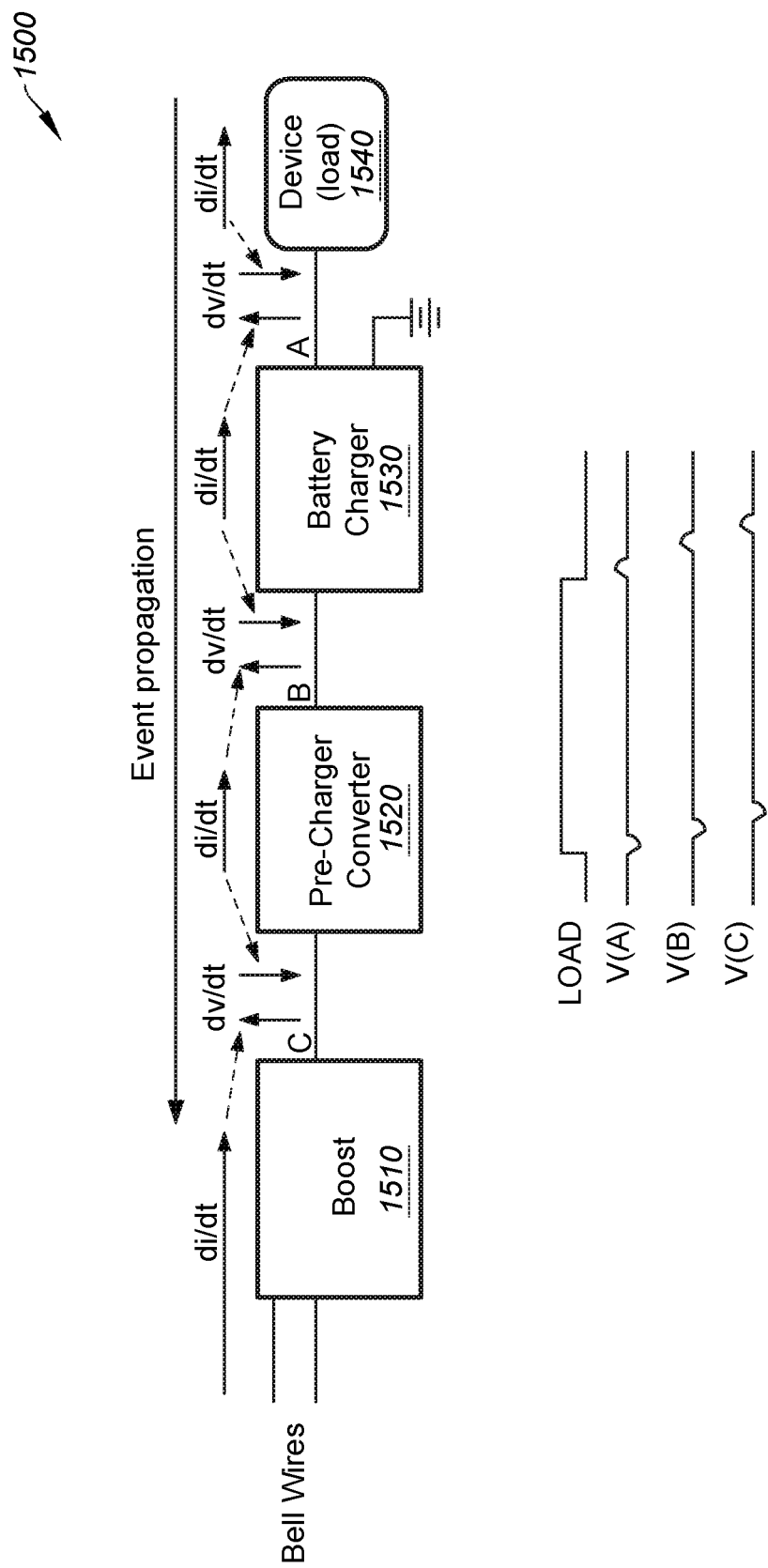
FIG. 15 shows an undamped battery charging circuit and corresponding waveforms for a doorbell system using a boost rectifier circuit topology, according to certain embodiments.

FIG. 15 shows an undamped battery charging circuit and corresponding waveforms for a doorbell system using a boost rectifier circuit topology, according to certain embodiments. A battery system may be incorporated into boost rectifier circuit 600 as a substitute (or supplementary) power source that can provision a load when the boost rectifier circuit 660 cannot, such as during a button press when the boost rectifier circuit 660 is bypassed. The battery charging circuit is typically charged by boost rectifier circuit 660. The battery charging circuit may draw more power (in additional to the system load) while charging its one or more batteries, and less power (or no power) when the batteries are fully charged. One goal of some doorbell systems is to isolate the solenoid current from transients that may results from an undamped or underdamped control loop for one or more systems downstream from the solenoid.

Referring to FIG. 15, a sudden increase in the system load (RL) may cause a di/dt event that causes the voltage at node A (Vout) to drop. The battery charger is not damped and may have a fast transient response thereby increasing its di/dt pushing the voltage back up at node A, and causing a voltage drop at node B. This, in turn, can cause more current draw from the battery charger 1530 (which can have its own control system), which changes dv/dt (point B) of a pre-charger converter system 1520, etc., until the cascading fluctuation in di/dt and dv/dt affects the current through the solenoid. Note that voltage nodes A, B, and C have capacitance which reduces the rate of change in voltage. These transients can be further reduced using damped systems, as shown in FIG. 16.

Figure 16:
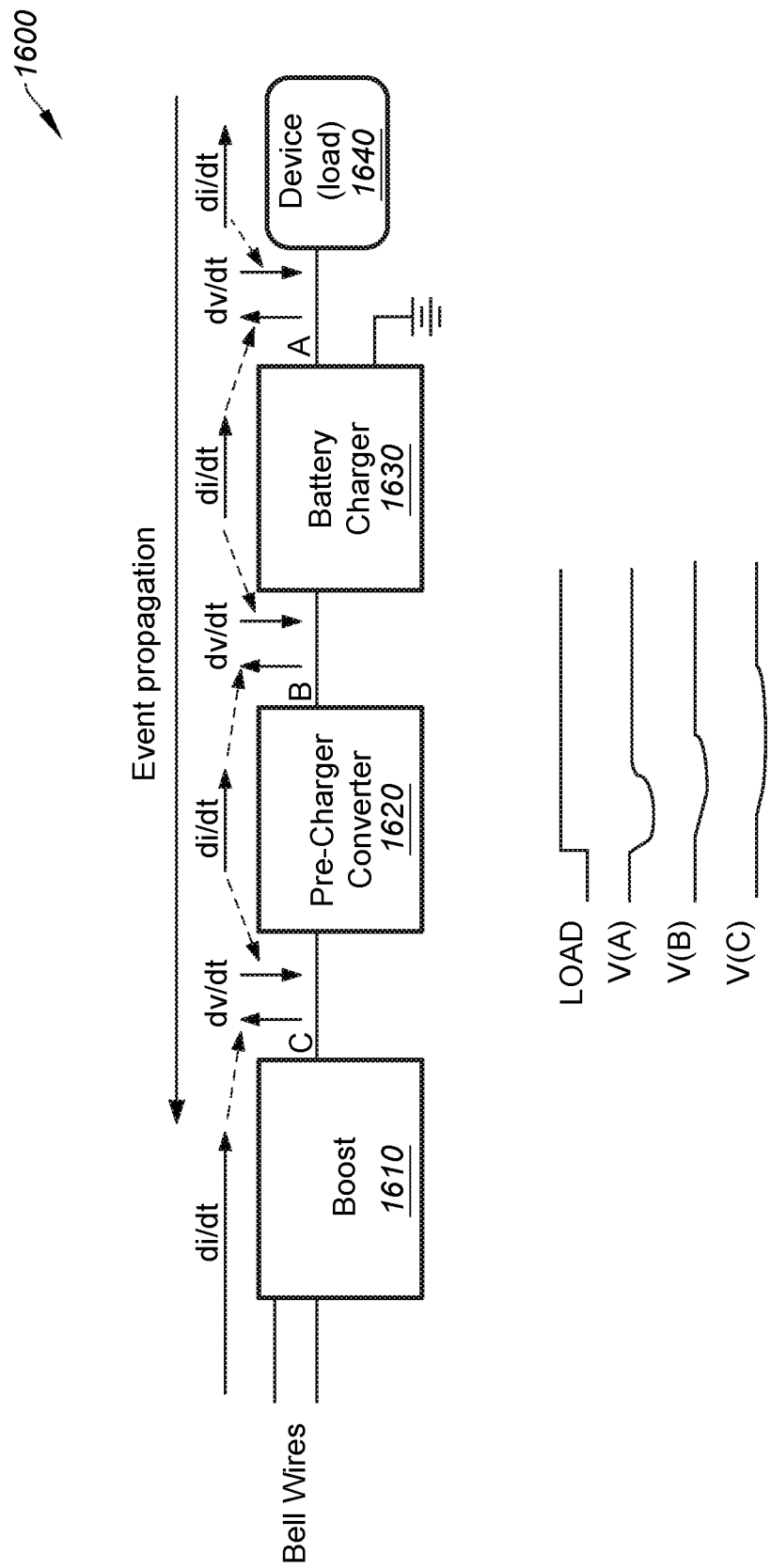
FIG. 16 shows a damped battery charging circuit and corresponding waveforms for a doorbell system using a boost rectifier circuit topology, according to certain embodiments.

FIG. 16 shows a damped battery charging circuit and corresponding waveforms for a doorbell system using a boost rectifier circuit topology, according to certain embodiments. A sudden increase in the device load may cause a di/dt event which, in turn, may cause the voltage at node A to drop. The battery charger response is damped, so di/dt ramps more slowly for the voltage at node A to drop, and takes more time to recover. This transient response propagates up the signal chain (to the left), but each time it is reduced in amplitude and increased in duration. Additionally, the battery charger can have a programmable input current limit which can be set to a low value while waiting for a load transient. If node A drops below a threshold, then current can be supplied by the battery. The current limit can then be incrementally increased until it is sufficient to operate the load. This will further reduce the di/dt cascading propagation back to the boost solenoid. Thus, the boost circuit does not have to react as strongly so a reduced di/dt with a less change in current that is spread overtime is possible. In some cases, the boost circuit, pre-charger converter, battery charger, or any other systems described herein may be operated, at least in part, by processor(s) 2810.

Figure 17:
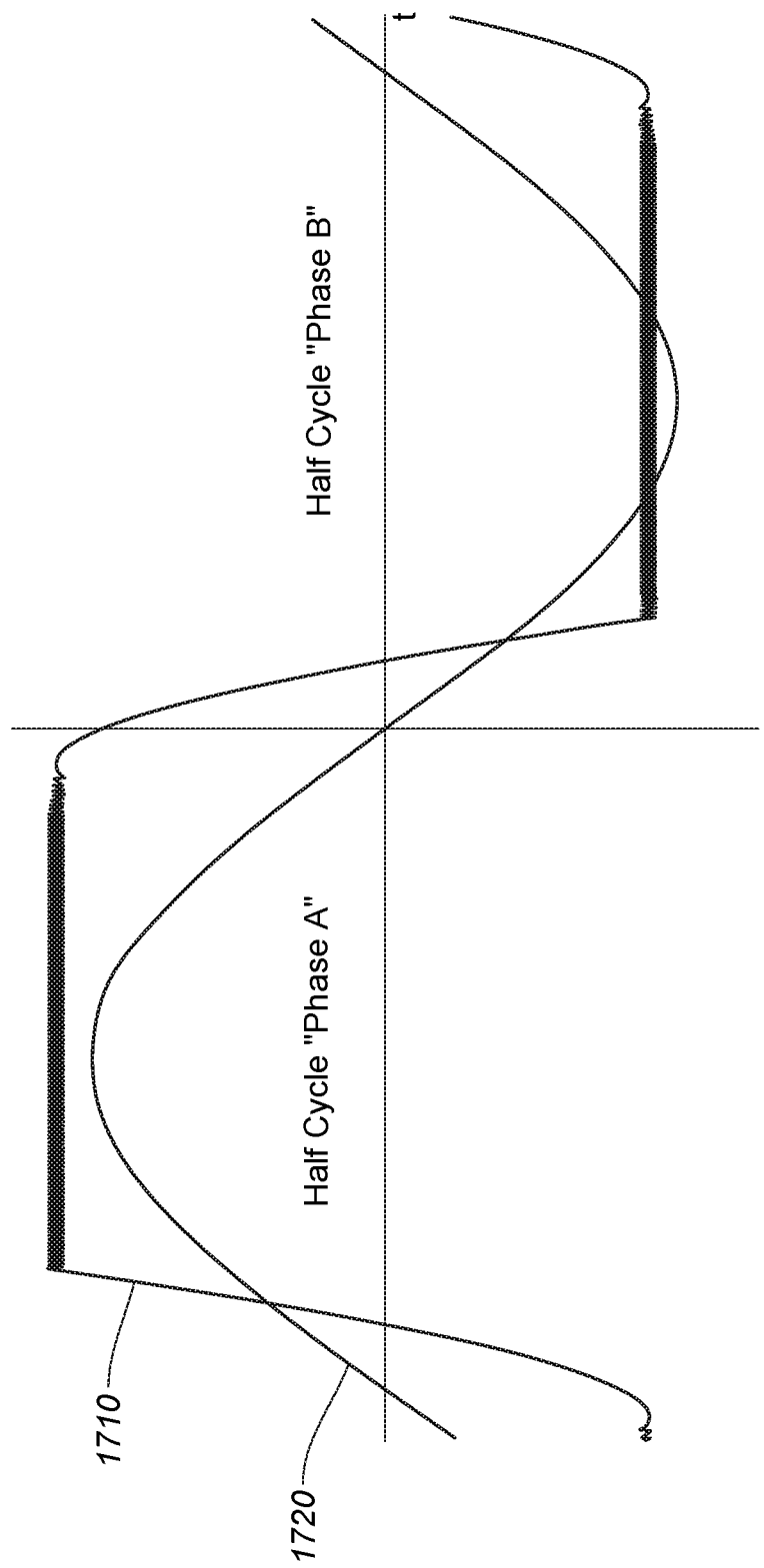
FIG. 17 shows an AC input voltage and solenoid current waveform during each phase of a boost rectification operation in a doorbell system, according to certain embodiments.
Figure 18:
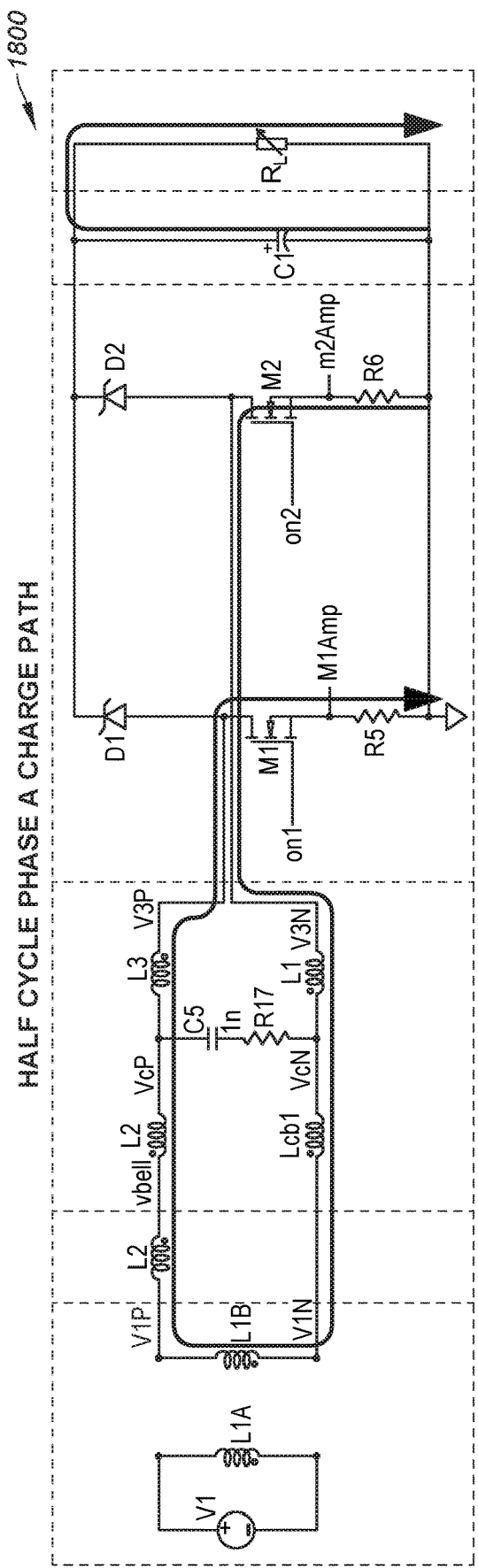
FIG. 18 shows a "half-cycle A" charge path for a doorbell system, according to certain embodiments.
Figure 19:
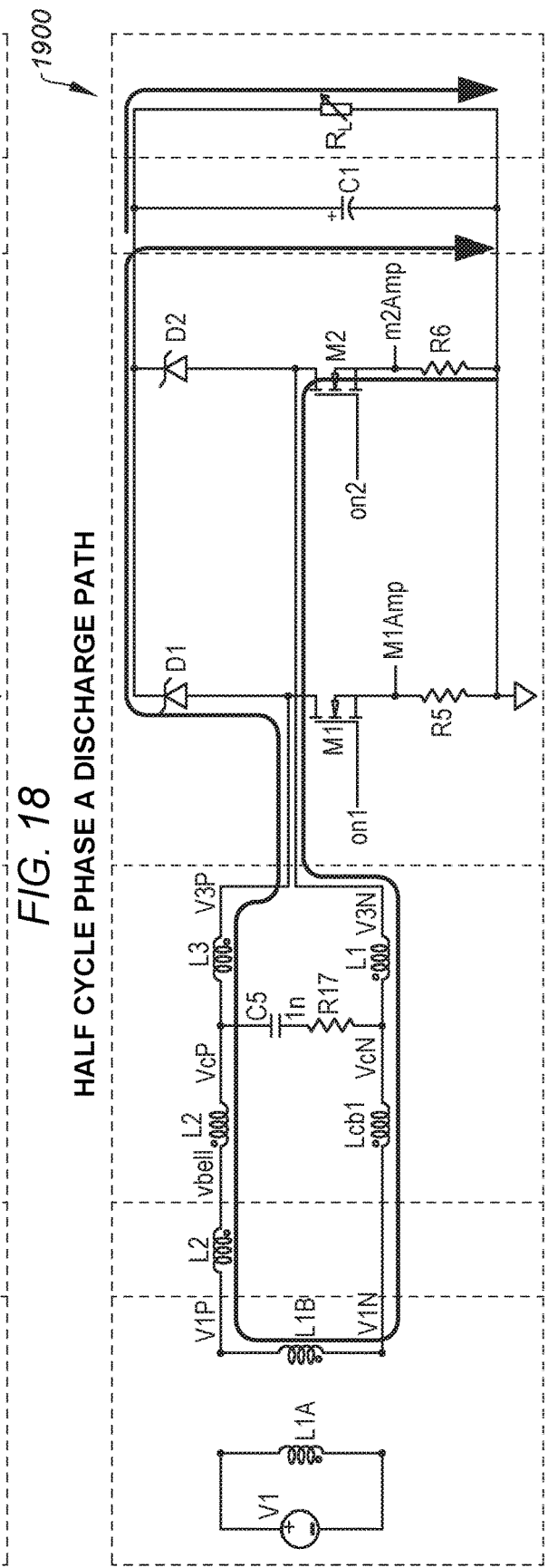
FIG. 19 shows a "half-cycle A" discharge path for a doorbell system, according to certain embodiments.
Figure 20:
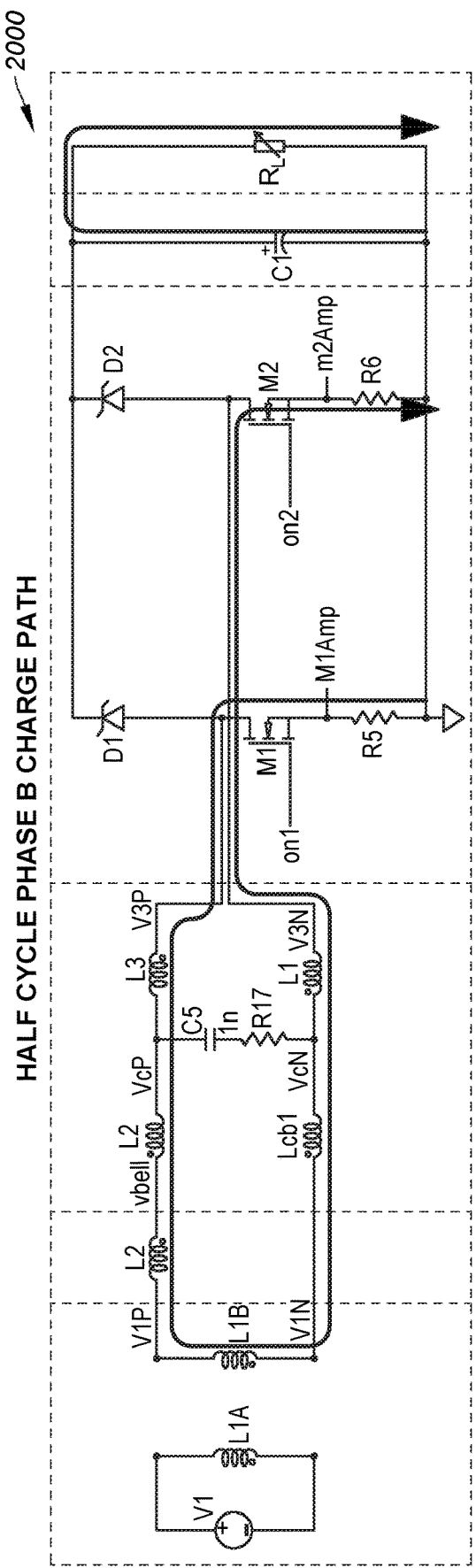
FIG. 20 shows a "half-cycle B" charge path for a doorbell system, according to certain embodiments.
Figure 21:
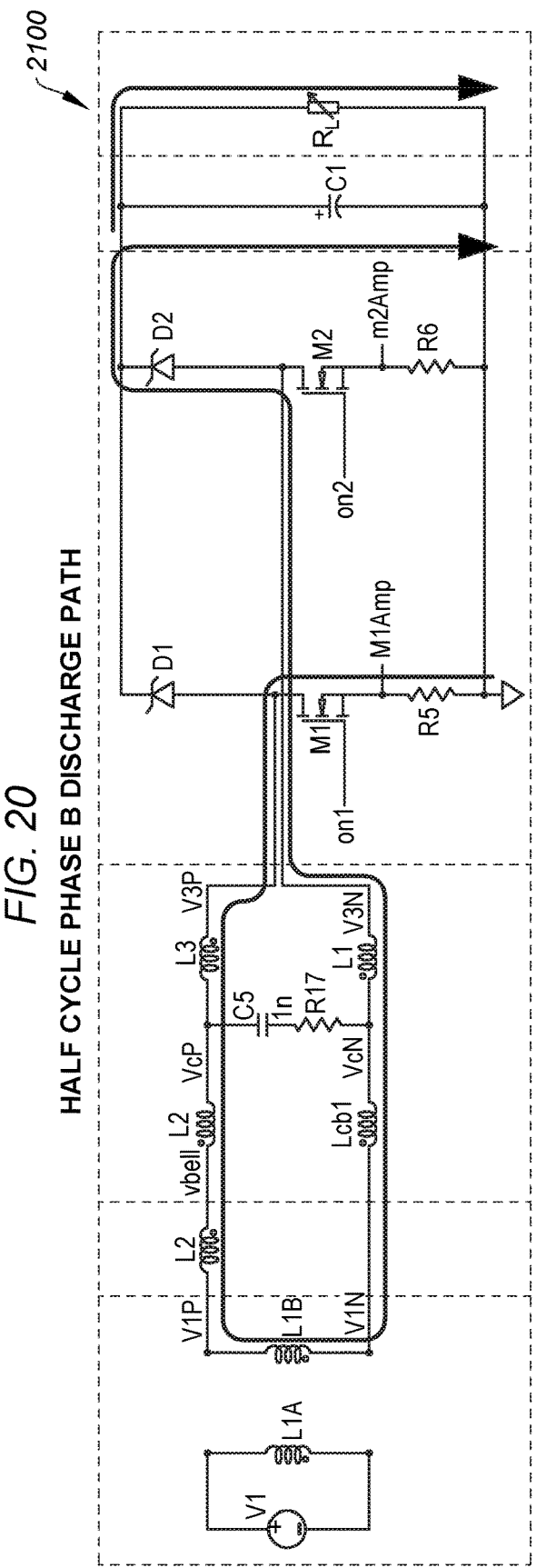
FIG. 21 shows a "half-cycle B" discharge path for a doorbell system, according to certain embodiments.

FIG. 17 shows an AC input voltage and solenoid current waveform during each phase of a boost rectification operation in a doorbell system, according to certain embodiments. The boost rectifier circuit 660 is operated in continuous current mode to generate charge/discharge ramps through IL2, as described in the figures that follow. Vin 1720 corresponds to the AC input voltage provided by stepdown transformer L1. Positive voltage excursions of Vin are referred to as "Phase A" and negative voltage excursions are referred to as "Phase B." Waveform 1710 corresponds to the current through L2. The peak of L2 is pulse-shaped into a square wave and the plateau of the square wave can be comprised of a high number of charge/discharge ramps, that can more easily be seen in FIGS. 22-23. FIGS. 18 and 19 show a charge/discharge path for Phase A in a boost rectified system, according to certain embodiments. FIGS. 20-21 show a charge/discharge path for Phase B in a boost rectified system, according to certain embodiments.

FIG. 22 shows a charge/discharge waveform for a boost rectifier circuit implemented by a pulse-width-modulator-based drive system during a low-amplitude portion of a positive phase of an AC input voltage, according to certain embodiments. A position A in the AC input voltage 2210, the voltage is very low on the positive phase swing (e.g., 1-2 V on a 16 Vpk input voltage). Current 2220 (IL2) may be the current in the charm circuit solenoid of the boost rectifier system 600. Pulse train 2230 can be a pulsed voltage input driving M1 and M2 in boost rectifier system 600. Each pulse of pulse train 2230 can correspond to a ramp up charge phase of the boost rectification system where FETs M1/M2 can be biased on. Periods between pulses (e.g., 0 V or other voltage that does not forward bias the gate-to-source of M1/M2) can correspond to ramp down charge phases of the boost rectification system where FETs M1/M2 can be biased off.

In some embodiments, the ratio of the ramp up/ramp down waveform (e.g., the duty cycle) may change through the AC input waveform (Vin). For example, when Vin is low (e.g., 0-2 V; point A), the ramp up may have a slow long period, and the ramp down may be fast, as shown in IL2 2220. However, during periods where Vin (2310) is high (e.g., 16V, point B), the ramp up may have a very short period, with a longer ramp down period, as shown in FIG. 23. Note that the duty cycle (e.g., 1-Vin/Vout) of pulse train 2230 (e.g., pulse high vs. pulse low) at low Vin values tends to be greater than 50% and may be closer to 75-80% (or more) near Vin=0-1 V, as a greater boost may be necessary to boost the low Vin to a target 40-45 V range. In contrast, the duty cycle 2330 of IL2 (2320) at high Vin values (2310, point B) tends to be less than 50% (e.g., where Vin/Vout approaches 1) and may be closer to 10-20% (or less) near Vin=Vpk (e.g., 16V), as a smaller boost may be necessary to boost the relatively high Vin to a target 40-45 V range. The greater boost at low Vin values and smaller boost at high Vin values results in a square-shaped current waveform, as shown at least in FIGS. 11-12 and 17.

In traditional DC-DC boost converter systems, the output voltage is monitored and when Vout drops the current is immediately increased, and when Vout rises, the current is immediately increased. The transient response in typical DC-DC boost converters is designed to be very fast in this regard in an effort to keep Vout constant. The sudden change in current, if applied to doorbell circuit, would have a very high likelihood of causing the chime device to ring due to the current spiking. In contrast, in a boost rectifier circuit (e.g., system 600), maintaining a constant Vout is not a primary consideration in the boost rectification process; rather, it is more pertinent to manage the rate of change of input current to prevent inadvertent ringing of the chime, according to certain embodiments of the invention. In some embodiments, as described above, a current limit threshold is set (e.g., via a DAC), and the boost rectification process adapts accordingly (e.g., pulse train duty cycle is adjusted). This can result in a slower transient response time and more variation in Vout, as compared to a traditional DC-DC boost converter system.

In some embodiments, the current limit threshold may be set in anticipation of an expected change in the load, rather than just reacting to present changes in the load. For example, a video doorbell system with a pulse-drive boost rectification system (e.g., system 600) may be configured to turn on IR emitters at certain times of the day when the ambient light falls below a certain level. In such cases, the current limit threshold may begin ramping up over a period of time (e.g., 0.5 s–1 s) to accommodate the greater power requirement of the IR emitters when applied. Note that changes in the load can cause Vout to rise or fall, which can cause system 600 to dynamically change the corresponding boost in the system. By anticipating the change, Vout may be adjusted so the resulting Vout after the change in load will rise or fall close to the desired output (e.g., 40-45), which can result in a more gradual change in Vout and IL2 to an equilibrium state, which can mitigate any potential current overshoot in IL2. It should be noted that although some of the embodiments described herein depict fixed-sized on/off pulse cycles, non-fixed pulse cycles may be used. For example, a variable pulse cycle may be useful during long charge periods (e.g., immediately after the doorbell button is released) for improved boost efficiency as fewer ramp down cycles may be needed to reach a target current threshold.

Figure 24:
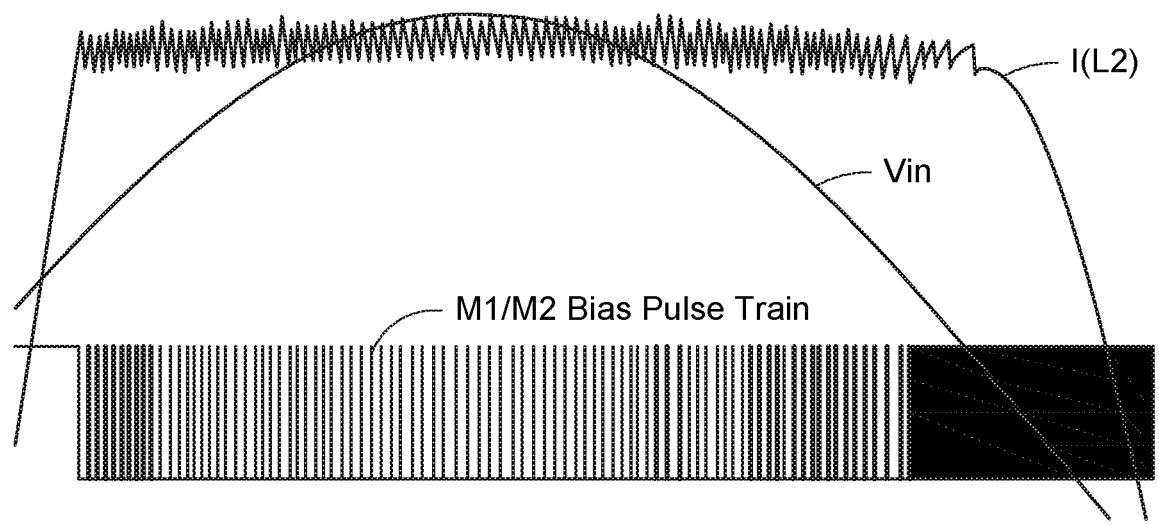
FIG. 24 shows a changing pulse frequency with respect to a phase of an AC input voltage, according to certain embodiments.

FIG. 24 shows a changing pulse frequency with respect to a phase of an AC input voltage, according to certain embodiments. Note that the variations seen at the top of the square wave of IL2 are a series of ramp up/ramp down periods. The PWM duty cycle changes throughout the phase (e.g., phase A) to accommodate the variation of the Vin/Vout ratio. During periods of low Vin, the PWM duty cycle is high (e.g., over 70%) resulting in a ramp up period that is much longer than the ramp down period. This appears in FIG. 24 as pulses that are very close to one another. At Vin values close to Vpk, the ramp up period may be much shorter than the ramp down period, resulting in relatively short and sparse pulses. Thus, boost rectification circuit 660 can dynamically change a boost amount over each phase of Vin (referred to as a "boost profile") in real-time and in a manner that eliminates or greatly reduces plunger overshoot in the chime circuit and prevents inadvertent ringing.

Figure 25:
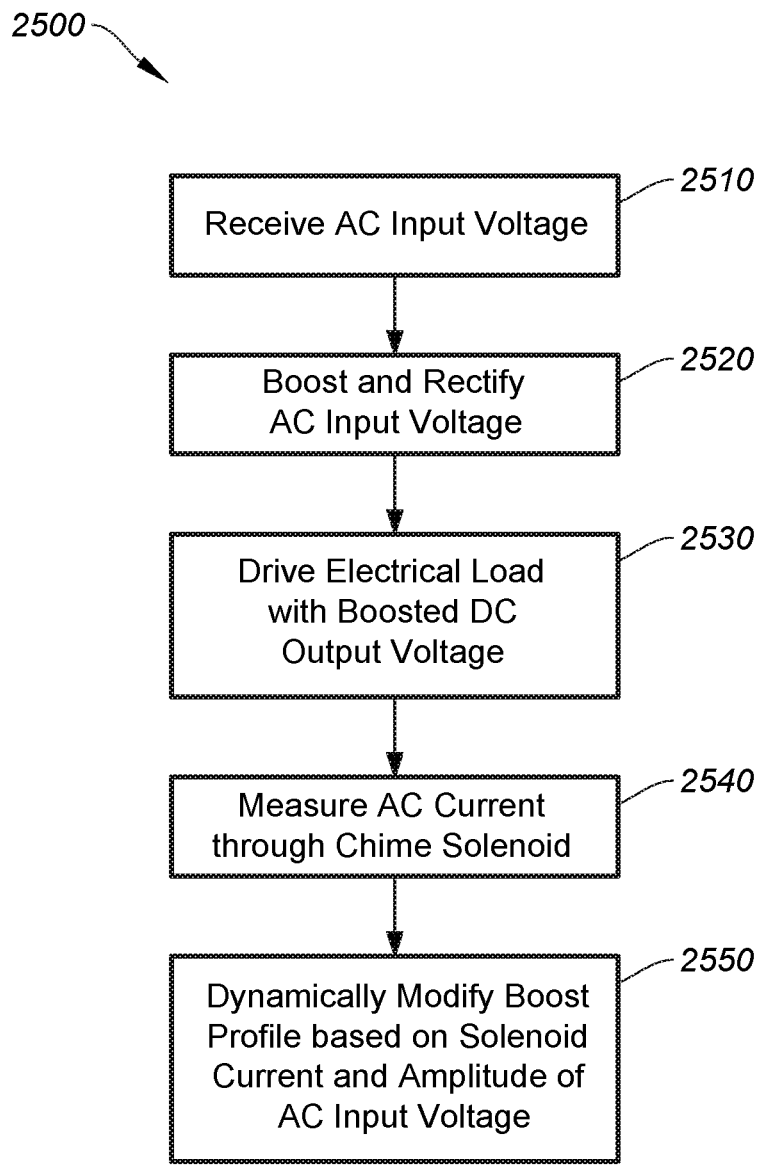
FIG. 25 shows a simplified flowchart showing an operation of a boost rectifier circuit in a doorbell system, according to certain embodiments.

FIG. 25 shows a simplified flow chart 2500 for operating a boost rectifier circuit in a doorbell system, according to certain embodiments. Method 2500 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 2500 can be performed by boost rectifier circuit 600, as shown in FIG. 6.

At block 2510, method 2500 can include receiving, by an input of a boost rectifier circuit, an AC input voltage. In some embodiments, AC input voltage (Vin) may be supplied by any suitable AC voltage source. Referring to FIG. 6, a wall voltage (e.g., 110/220 V) is stepped down via transformer (L1) to produce an 8, 16, or 24 V input voltage.

At block 2520, method 2500 can include simultaneously boosting an amplitude of the AC input voltage and rectifying the AC input voltage, thereby generating a boosted DC output voltage at an output of the boost rectifier circuit.

At block 2530, method 2500 can include driving an electrical load RL (650) with the boosted DC output voltage.

At block 2540, method 2500 can include measuring an AC current through a solenoid (L2) of a mechanical doorbell chime circuit coupled to the input of the boost rectifier circuit. The solenoid may be driven by the AC input voltage. The boost rectification circuit (660) may utilize the solenoid an energy storage element to facilitate the boosting of the amplitude of the AC input voltage.

At block 2550, method 2500 can include dynamically modifying a boosting profile on the AC input voltage based on the measured AC current in the solenoid and an amplitude of the AC input voltage, as further described above with respect to FIGS. 6, 11-14, and 17-24.

It should be appreciated that the specific steps illustrated in FIG. 25 provide a particular method 2500 for operating a boost rectifier circuit in a doorbell system, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

For example, some embodiments may additionally or alternatively control the type and interval of the ding, dong, buzzing and frequency of the buzzing. Systems can be programmed via software to make a custom chime sound at the discretion of the user or, when combined with facial recognition, object detection, device detection, audio detection, or fingerprinting; custom chime patterns can be implemented for different people or objects detected, for example, within a video stream of a video doorbell system. One of ordinary skill in the art with the benefit of this disclosure would understand the many variations, modifications, and alternative embodiments thereof.

Figure 26:
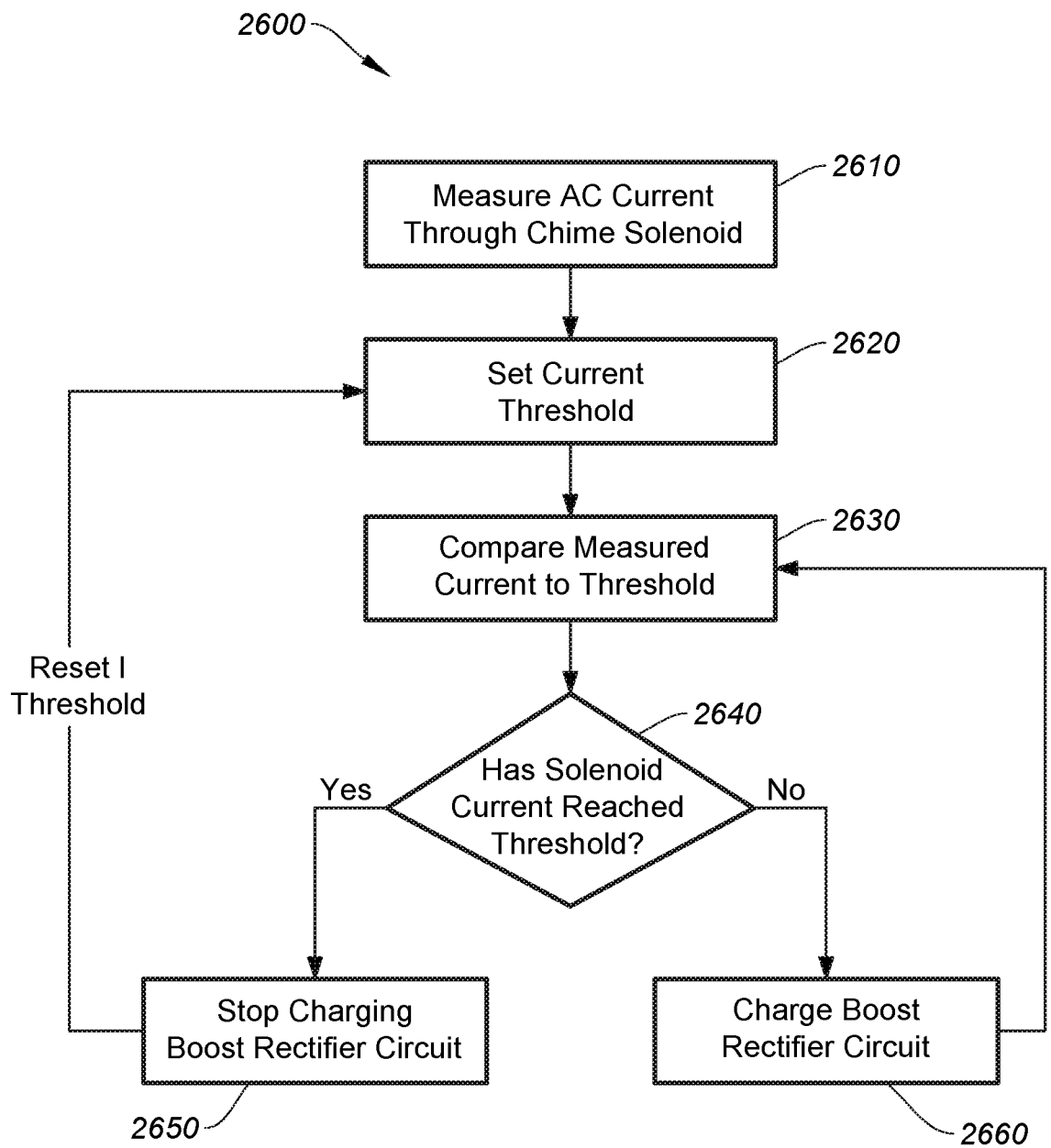
FIG. 26 shows a simplified flowchart showing an operation of a boost rectifier circuit in a doorbell system, according to certain embodiments.

FIG. 26 shows a simplified flowchart showing an operation of a boost rectifier circuit in a doorbell system, according to certain embodiments. Method 2600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 2600 can be performed by system 1400, as shown in FIG. 14.

At block 2610, method 2600 can include measuring an AC current through a chime device solenoid (L2), according to certain embodiments. In some embodiments, the current can be measured through shunt resistors R5/R6 of boost rectification circuit 660. For instance, current through L2 may be measured across R5 by I=E/R.

At block 2620, method 2600 can include setting a current threshold through solenoid L2. In some embodiments, the current threshold may be set by modifying a voltage setting on DAC 1410 for each charge/discharge cycle, as described above with respect to FIG. 14.

At block 2630, method 2600 can include comparing the measured solenoid current (IL2) to the current threshold. At block 2640, if the solenoid current (IL2) reaches the current threshold, the boost rectification circuit 660 stops charging 2650 for that cycle in the charge/discharge cycle (e.g., the ramp down portion begin), as shown and described above with respect to FIGS. 22-23. In some cases, the DAC may be reset to a new current threshold value for the next cycle, and method 2600 returns to block 2620.

At block 2640, method 2600 if the solenoid current (IL2) has not reach the current threshold (2660), the boost rectification circuit continues charging 1760 for that cycle in the charge/discharge cycle (e.g., the ramp up portion continues in that cycle), and system 1400 continues comparing the measured current with the current limit (2630).

It should be appreciated that the specific steps illustrated in FIG. 26 provide a particular method 2600 for operating a boost rectifier circuit in a doorbell system, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Using a Boost Rectifier Circuit with a Digital Chime Circuit

Figure 27:
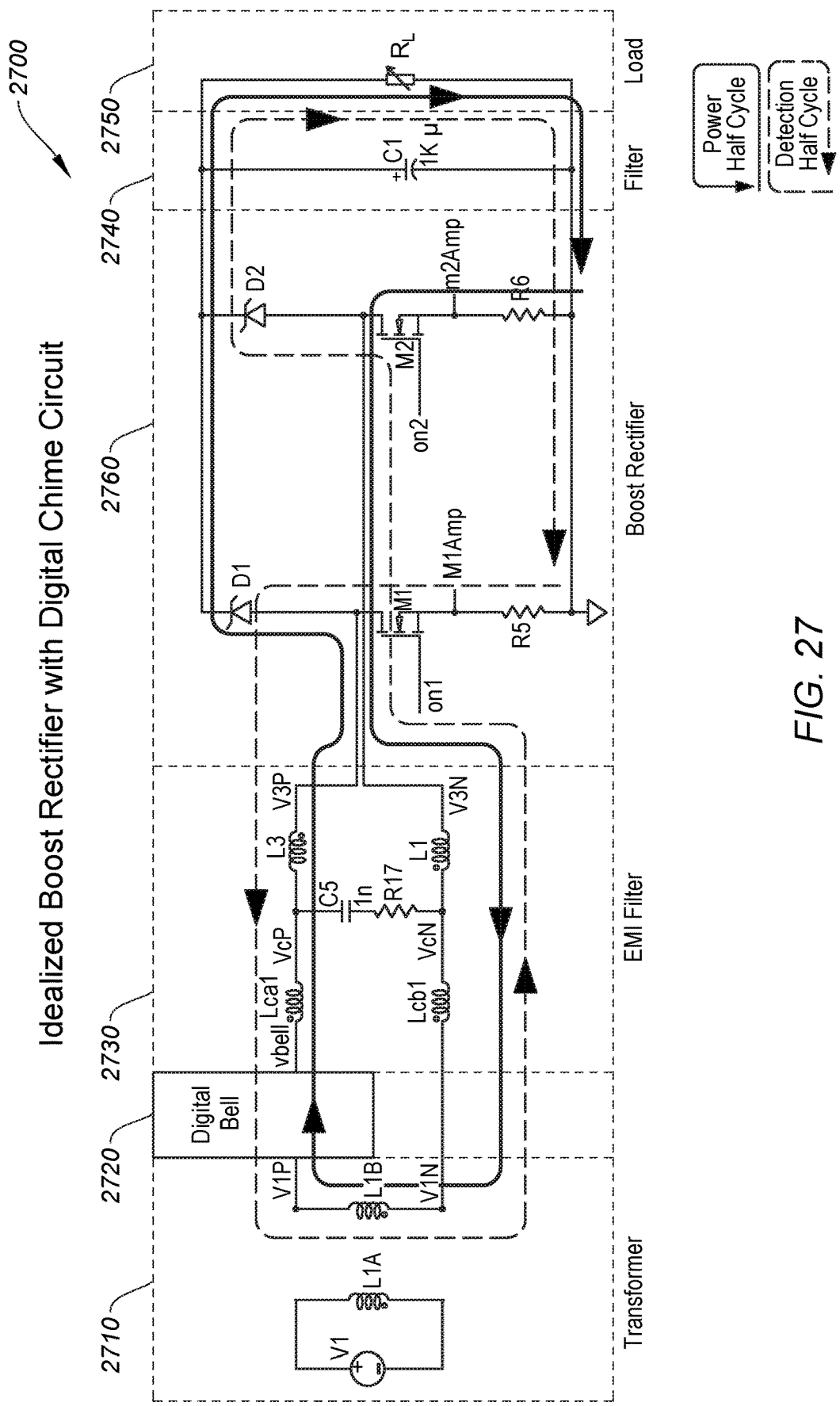
FIG. 27 shows a charge/discharge waveform for a boost rectifier circuit used with a digital chime circuit, according to certain embodiments.

FIG. 27 shows a charge/discharge waveform for a boost rectifier circuit 2700 used with a digital chime circuit, according to certain embodiments. Circuit 2700 emulates the operation of bypass diode 270 of circuit 250 by keeping one of the NMOS transistors turned on. For example, turning on M2 continuously provides the power half-cycle (solid-line current path) and the detection half-cycle (dashed-line current path), as shown in FIG. 27. Such circuit topologies may be advantageous as no additional cumbersome installations (e.g., a bypass diode), as they typically are in convention digital doorbell designs, as shown in FIG. 2B.

System for Operating Aspects of a Boost Rectified Circuit

Figure 28:
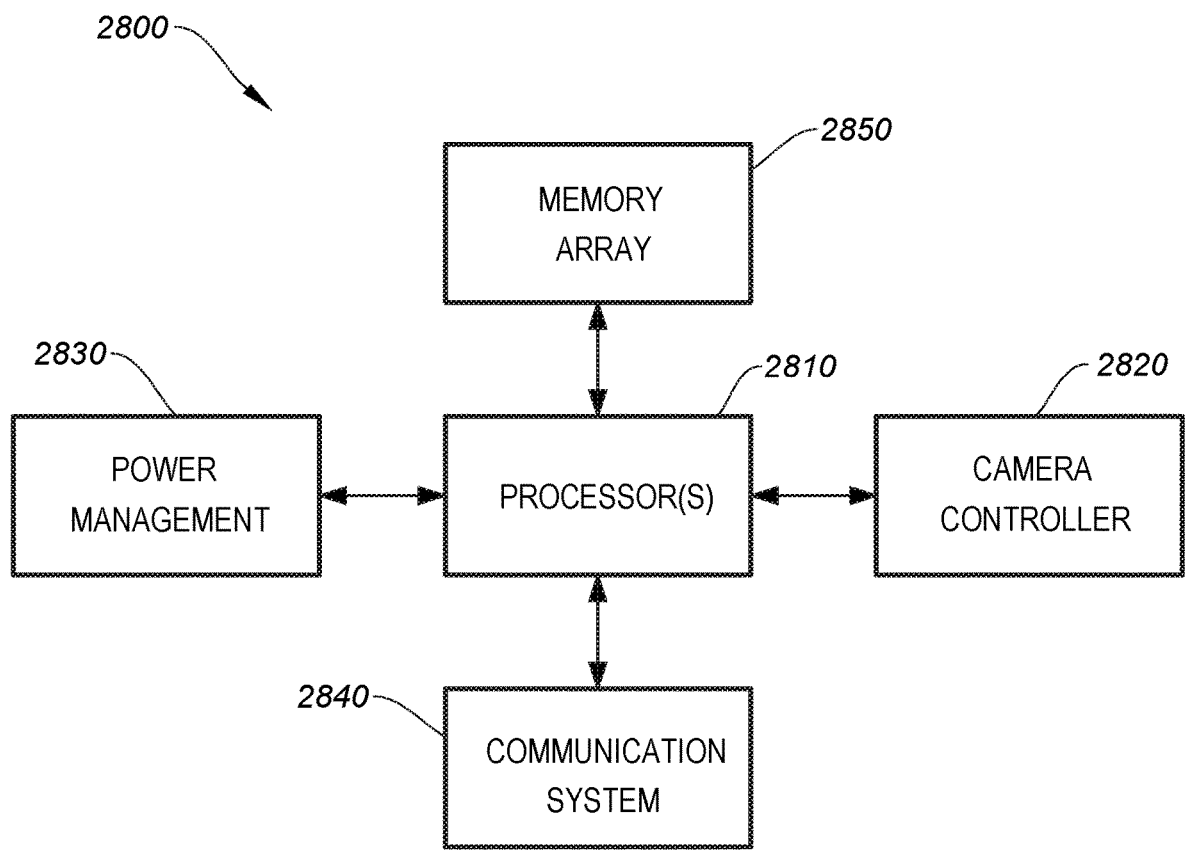
FIG. 28 shows a simplified block diagram of a doorbell system, according to certain embodiments.

In some embodiments, a boost rectifier circuit may be used to drive a number of different loads including video camera systems, audio systems, sensor systems, battery charging systems (derivative power supply systems), or any other systems, and combinations thereof. FIG. 28 is a simplified block diagram of a system 2800 that can be configured to operate, for instance, a doorbell/camera system using a boost rectifier system (600, 2700), according to certain embodiments. System 2800 can include processor(s) 2810, camera controller 2820, power management system 2830, communication system 2840, and memory array 2850. Each of system blocks 2820-2850 can be in electrical communication with processor(s) 2810. System 2800 may include more or fewer systems, as would be appreciated by one of ordinary skill in the art, and are not shown or discussed to prevent obfuscation of the novel features described herein. System blocks 2820-2850 may be implemented as separate modules, or alternatively, two or more system blocks may be combined in a single module. For instance, some or all of system blocks 2820-2850 may be subsumed by processor(s) 2810. System 2800 and variants thereof can be used to operate the various rectification circuits described and depicted throughout this disclosure (e.g., FIGS. 5, 6, 14-16, 18-27). It should be understood that references to specific systems when describing aspects of system 2800 are provided for explanatory purposes and should not be interpreted as limiting to any particular embodiment.

In certain embodiments, processor(s) 2810 may include one or more microprocessors (μCs) and may control the operation of system 2800. Alternatively, processor(s) 2810 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, processor(s) 2810 may be configured to control aspects of charging controls, media controls, and the like. Further, processor(s) 2810 may operate aspects of circuits 500, 600, 2700, etc., such as controlling the operation of the FETs (e.g., controlling the PWM circuit, as shown in FIG. 14), or any other electrical circuitry described herein, as would be appreciated by one of ordinary skill in the art with the benefit of this disclosure.

Camera controller 2820 may be configured to control aspects of a modular video camera system for any of the embodiments shown and described. In some aspects, camera controller 2820 may control lens operations including focus control, zoom control, movement control (e.g., individual movement of the lens), or the like. In some implementations, camera controller 2820 can receive sensor data including ambient visible light detection, ambient IR light detection, audio data (e.g., from an on-board microphone), or the like.

In some embodiments, camera controller 2820 can control the image quality generated by a video camera system 120. For example, the image quality of still images or video can be reduced (e.g., low-definition) when low-bandwidth conditions exist, and increased (e.g., high-definition) when high-bandwidth conditions exist. One of ordinary skill in the art would understand the many variations, modifications, and alternative embodiments thereof.

Memory array 2850 can store information such as camera control parameters, system control parameters (operations of system 1400), communication parameters, or the like. Memory array 2850 may store one or more software programs to be executed by processors (e.g., processor(s) 2810). It should be understood that "software" can refer to sequences of instructions that, when executed by processor(s), cause system 2800 to perform certain operations of software programs. The instructions can be stored as firmware residing in read-only memory (ROM) and/or applications stored in media storage that can be read into memory for processing by processing devices (processor(s) 2810). Software can be implemented as a single program or a collection of separate programs and can be stored in non-volatile storage and copied in whole or in-part to volatile working memory during program execution. Memory array 2850 can include random access memory (RAM), read-only memory (ROM), long term storage (e.g., hard drive, optical drive, etc.), and the like, as would be understood by one of ordinary skill in the art.

Power management system 2830 can be configured to manage power distribution between systems (blocks 2810-2850), mode operations, power efficiency, and the like, for the various modular video camera system described herein. In some embodiments, power management system 2830 can include one or more energy storage devices (e.g., batteries—not shown), a recharging system for the battery (e.g., using a USB cable), power management devices (e.g., voltage regulators), or the like. In certain embodiments, the functions provided by power management system 2830 may be incorporated into processor(s) 2810. An energy storage device can be any suitable rechargeable energy storage device including, but not limited to, NiMH, NiCd, lead-acid, lithium-ion, lithium-ion polymer, and the like. Energy storage devices may be recharged via a cable (e.g., USB cable, data cable, dedicated power supply cable, etc.), or inductive power coupling.

Communication system 2840 can be configured to provide wired (e.g., via a power/data cable) and/or wireless communication between camera system 300 and one or more external computing devices, peripheral devices, remote servers, local or remotely located routing devices, or the like. Some non-limiting examples of communication between camera mounting device and an external computing device can include camera control operations, communicating status updates including memory capacity and usage, operational properties (e.g., camera specifications, mode of operation, etc.) and the like. Communications system 2840 can be configured to provide radio-frequency (RF), Bluetooth, infra-red, ZigBee, or other suitable communication protocol to communicate with other computing devices. In some embodiments, a data cable can be a USB cable, FireWire cable, or other cable to enable bi-directional electronic communication between video camera system 300 and an external computing device. Some embodiments may utilize different types of cables or connection protocol standards to establish hardwired or wireless communication with other entities.

Although certain necessary systems may not expressly discussed, they should be considered as part of system 2800, as would be understood by one of ordinary skill in the art. For example, system 2800 may include a bus system to transfer power and/or data to and from the different systems therein.

It should be appreciated that system 2800 is illustrative and that variations and modifications are possible. System 2800 can have other capabilities not specifically described herein. Further, while system 2800 is described with reference to particular blocks (2810-2850), it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks may or may not be reconfigurable depending on how the initial configuration is obtained.

The following embodiments (as are the embodiments preceding this paragraph) are supported by the entirety of the description above and can incorporate elements from any combination of embodiments shown or not shown (but described) with respect to the figures. In some embodiments, a method of operating a boost rectifier circuit of a doorbell system includes receiving measurement data corresponding to a measurement of an AC current signal driving an inductor of the doorbell system, the inductor coupled to an input of the boost rectifier circuit, wherein the inductor is driven by an AC input voltage, and wherein the inductor is operating as an energy storage element configured to facilitate the boosting of an amplitude of the AC input voltage by the boost rectifier circuit. The method can further include dynamically modifying a boosting profile of the AC input voltage based on: the measured AC current signal passing through the inductor; and an amplitude of the AC input voltage, wherein the boosting profile pulse shapes the AC current signal driving the inductor from a sinusoidal current waveform to a substantially square-wave current waveform.

In some aspects, the pulse shaping of the AC current signal into a square-wave current waveform causes a reduction in a maximum current of the AC current signal and a reduction in a transition time between peaks of different phases of the AC current signal. Dynamically modifying the boosting profile of the AC input voltage can further include: applying a pulsed voltage at inputs of the boost rectifier circuit; and generating a charge/discharge ramp for each cycle of the AC input voltage based on the pulsed voltage, wherein the charge/discharge ramp affects the boosting profile of the AC input voltage. The charge ramp can correspond to periods of time when the pulsed voltage is on, wherein the discharge ramp can correspond to periods of time when the pulsed voltage is off, and wherein a ratio of the charge-to-discharge periods defines an operational duty cycle for the boost rectifier circuit. In some cases, the pulsed voltage is on during each phase of the AC input voltage while the measured AC current signal through the inductor is below a threshold current value, and the pulsed voltage is off during each phase of the AC input voltage while the measured AC current signal driving the inductor is at or above the threshold current value.

In some embodiments, a pulse-width modulator (PWM) circuit controlled by one or more processors can be configured to apply the pulsed voltage at the input of the boost rectifier circuit. The method can further include dynamically setting a current limit threshold for the AC current signal based on a current power requirement of a system load; comparing the current limit threshold with the AC current signal; generating a corresponding comparator output signal; and adjusting the duty cycle of the pulsed input voltage based on the comparator output signal. In certain embodiments, a digital-to-analog converter (DAC) may perform the dynamically setting the current limit threshold, a comparator circuit may perform the comparing the current limit threshold with the AC current signal and generates the corresponding comparator output signal, and the PWM circuit may perform the adjusting the duty cycle of the pulsed input voltage based on the comparator output signal. The boost rectifier circuit can be configured to drive a battery charging circuit for a battery system configured to provide power to an electric load. In some implementations, the inductor may be a solenoid of a doorbell chime circuit of the doorbell system.

In certain embodiments, a doorbell system comprises: one or more processors; and one or more non-transitory computer-readable storage mediums that include instructions configured to cause one or more processors to perform operations including: receiving measurement data corresponding to a measurement of an AC current signal driving an inductor of the doorbell system, the inductor coupled to an input of a boost rectifier circuit, wherein the inductor is driven by an AC input voltage, and wherein the inductor is operating as an energy storage element configured to facilitate the boosting of an amplitude of the AC input voltage by the boost rectifier circuit; and dynamically modifying a boosting profile of the AC input voltage based on: the measured AC current signal passing through the inductor; and an amplitude of the AC input voltage, wherein the boosting profile pulse shapes the AC current signal driving the inductor from a sinusoidal current waveform to a substantially square-wave current waveform. In some aspects, the pulse shaping of the AC current signal into a square-wave current waveform causes a reduction in a maximum current of the AC current signal and a reduction in a transition time between peaks of different phases of the AC current signal.

In some implementations, dynamically modifying the boosting profile of the AC input voltage further includes: applying a pulsed voltage at inputs of the boost rectifier circuit; and generating a charge/discharge ramp for each cycle of the AC input voltage based on the pulsed voltage, wherein the charge/discharge ramp affects the boosting profile of the AC input voltage. The charge ramp may correspond to periods of time when the pulsed voltage is on, wherein the discharge ramp may correspond to periods of time when the pulsed voltage is off, and wherein a ratio of the charge-to-discharge periods defines an operational duty cycle for the boost rectifier circuit. In some cases, the pulsed voltage is on during each phase of the AC input voltage while the measured AC current signal through the inductor is below a threshold current value, and the pulsed voltage can be off during each phase of the AC input voltage while the measured AC current signal driving the inductor is at or above the threshold current value.

In some embodiments, a pulse-width modulator (PWM) circuit controlled by one or more processors may apply the pulsed voltage at the input of the boost rectifier circuit. In some implementations, the one or more non-transitory computer-readable storage mediums further include instructions configured to cause one or more processors to perform operations including: dynamically setting a current limit threshold for the AC current signal based on a current power requirement of a system load; comparing the current limit threshold with the AC current signal; generating a corresponding comparator output signal; and adjusting the duty cycle of the pulsed input voltage based on the comparator output signal. In some cases, a digital-to-analog converter (DAC) performs the dynamically setting the current limit threshold, wherein a comparator circuit performs the comparing the current limit threshold with the AC current signal and generates the corresponding comparator output signal, and wherein the PWM circuit performs the adjusting the duty cycle of the pulsed input voltage based on the comparator output signal. The boost rectifier circuit can be configured to drive a battery charging circuit for a battery system configured to provide power to an electric load. In certain embodiments, the inductor is a solenoid of a doorbell chime circuit of the doorbell system.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of operating a boost rectifier circuit of a doorbell system, the method comprising:
receiving measurement data corresponding to a measurement of an AC current signal driving an inductor of the doorbell system, the inductor coupled to an input of the boost rectifier circuit,
wherein the inductor is driven by an AC input voltage, and
wherein the inductor is operating as an energy storage element configured to facilitate the boosting of an amplitude of the AC input voltage by the boost rectifier circuit; and
dynamically modifying a boosting profile of the AC input voltage based on:
the measured AC current signal passing through the inductor; and
an amplitude of the AC input voltage,
wherein the boosting profile pulse shapes the AC current signal driving the inductor from a sinusoidal current waveform to a substantially square-wave current waveform.

2. The method of claim 1 wherein the pulse shaping of the AC current signal into a square-wave current waveform causes a reduction in a maximum current of the AC current signal and a reduction in a transition time between peaks of different phases of the AC current signal.

3. The method of claim 2 wherein dynamically modifying the boosting profile of the AC input voltage further includes:
applying a pulsed voltage at inputs of the boost rectifier circuit; and
generating a charge/discharge ramp for each cycle of the AC input voltage based on the pulsed voltage,
wherein the charge/discharge ramp affects the boosting profile of the AC input voltage.

4. The method of claim 3 wherein the charge ramp corresponds to periods of time when the pulsed voltage is on, wherein the discharge ramp corresponds to periods of time when the pulsed voltage is off, and wherein a ratio of charge-to-discharge periods defines an operational duty cycle for the boost rectifier circuit.

5. The method of claim 4 wherein the pulsed voltage is on during each phase of the AC input voltage while the measured AC current signal through the inductor is below a threshold current value, and
wherein the pulsed voltage is off during each phase of the AC input voltage while the measured AC current signal driving the inductor is at or above the threshold current value.

6. The method of claim 4 wherein a pulse-width modulator (PWM) circuit controlled by one or more processors applies the pulsed voltage at the input of the boost rectifier circuit.

7. The method of claim 6 further comprising:
dynamically setting a current limit threshold for the AC current signal based on a current power requirement of a system load;
comparing the current limit threshold with the AC current signal;
generating a corresponding comparator output signal; and
adjusting the duty cycle of the pulsed input voltage based on the comparator output signal.

8. The method of claim 7 wherein a digital-to-analog converter (DAC) performs the dynamically setting the current limit threshold,
wherein a comparator circuit performs the comparing the current limit threshold with the AC current signal and generates the corresponding comparator output signal, and
wherein the PWM circuit performs the adjusting the duty cycle of the pulsed input voltage based on the comparator output signal.

9. The method of claim 1 wherein the boost rectifier circuit is configured to drive a battery charging circuit for a battery system configured to provide power to an electric load.

10. The method of claim 1 wherein the inductor is a solenoid of a doorbell chime circuit of the doorbell system.

11. A doorbell system comprising:
one or more processors; and
one or more non-transitory computer-readable storage mediums that include instructions configured to cause one or more processors to perform operations including:

receiving measurement data corresponding to a measurement of an AC current signal driving an inductor of the doorbell system, the inductor coupled to an input of a boost rectifier circuit,
- wherein the inductor is driven by an AC input voltage, and
- wherein the inductor is operating as an energy storage element configured to facilitate the boosting of an amplitude of the AC input voltage by the boost rectifier circuit; and dynamically modifying a boosting profile of the AC input voltage based on:
- the measured AC current signal passing through the inductor; and
- an amplitude of the AC input voltage, wherein the boosting profile pulse shapes the AC current signal driving the inductor from a sinusoidal current waveform to a substantially square-wave current waveform.

12. The doorbell system of claim 11 wherein the pulse shaping of the AC current signal into a square-wave current waveform causes a reduction in a maximum current of the AC current signal and a reduction in a transition time between peaks of different phases of the AC current signal.

13. The doorbell system of claim 12 wherein dynamically modifying the boosting profile of the AC input voltage further includes:
- applying a pulsed voltage at inputs of the boost rectifier circuit; and
- generating a charge/discharge ramp for each cycle of the AC input voltage based on the pulsed voltage,
- wherein the charge/discharge ramp affects the boosting profile of the AC input voltage.

14. The doorbell system of claim 13 wherein the charge ramp corresponds to periods of time when the pulsed voltage is on, wherein the discharge ramp corresponds to periods of time when the pulsed voltage is off, and wherein a ratio of charge-to-discharge periods defines an operational duty cycle for the boost rectifier circuit.

15. The doorbell system of claim 14 wherein the pulsed voltage is on during each phase of the AC input voltage while the measured AC current signal through the inductor is below a threshold current value, and
- wherein the pulsed voltage is off during each phase of the AC input voltage while the measured AC current signal driving the inductor is at or above the threshold current value.

16. The doorbell system of claim 14 wherein a pulse-width modulator (PWM) circuit controlled by one or more processors applies the pulsed voltage at the input of the boost rectifier circuit.

17. The doorbell system of claim 16 wherein the one or more non-transitory computer-readable storage mediums further include instructions configured to cause one or more processors to perform operations including:
- dynamically setting a current limit threshold for the AC current signal based on a current power requirement of a system load;
- comparing the current limit threshold with the AC current signal;
- generating a corresponding comparator output signal; and
- adjusting the duty cycle of the pulsed input voltage based on the comparator output signal.

18. The doorbell system of claim 17 wherein a digital-to-analog converter (DAC) performs the dynamically setting the current limit threshold,
- wherein a comparator circuit performs the comparing the current limit threshold with the AC current signal and generates the corresponding comparator output signal, and
- wherein the PWM circuit performs the adjusting the duty cycle of the pulsed input voltage based on the comparator output signal.

19. The doorbell system of claim 11 wherein the boost rectifier circuit is configured to drive a battery charging circuit for a battery system configured to provide power to an electric load.

20. The doorbell system of claim 11 wherein the inductor is a solenoid of a doorbell chime circuit of the doorbell system.

* * * * *